(12) United States Patent
Suzuki et al.

(10) Patent No.: US 8,393,961 B2
(45) Date of Patent: Mar. 12, 2013

(54) STORAGE MEDIUM HAVING STORED THEREON GAME PROGRAM, AND GAME APPARATUS

(75) Inventors: Ichiro Suzuki, Kyoto (JP); Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 695 days.

(21) Appl. No.: 12/548,887

(22) Filed: Aug. 27, 2009

(65) Prior Publication Data

US 2010/0304857 A1   Dec. 2, 2010

(30) Foreign Application Priority Data

May 28, 2009   (JP) .................. 2009-128805

(51) Int. Cl.
  *A63F 9/24*    (2006.01)
  *A63F 13/00*   (2006.01)
  *G06F 17/00*   (2006.01)
  *G06F 19/00*   (2011.01)
(52) U.S. Cl. ................. 463/31; 463/32; 463/33; 463/34
(58) Field of Classification Search ............ 463/31
  See application file for complete search history.

(56) References Cited

U.S. PATENT DOCUMENTS 5,704,836 A * 1/1998 Norton et al. ............... 463/36
6,126,545 A * 10/2000 Takahashi et al. .......... 463/32

FOREIGN PATENT DOCUMENTS

| EP | 1 671 685 | 6/2006 |
| EP | 1 744 284 | 1/2007 |
| JP | 10-165647 | 6/1998 |
| JP | 2004-174077 | 6/2004 |
| JP | 2006-218318 | 8/2006 |
| JP | 2006-297114 | 11/2006 |

OTHER PUBLICATIONS

Mario Kart DS, released Nov. 14, 2005, Nintendo, manual and information wiki (http://web.archive.org/web/20070110212548/http://www.mariowiki.com/Mario_Kart_DS, dated Jan. 10, 2007).*

* cited by examiner

*Primary Examiner* — Michael Cuff
*Assistant Examiner* — Kevin Y Kim
(74) *Attorney, Agent, or Firm* — Nixon & Vanderhye, P.C.

(57) ABSTRACT

A game apparatus calculates a reference direction of each boat by combining a velocity vector and a front direction vector of each boat at a predetermined rate. Next, the game apparatus calculates an average direction by performing weighted averaging of the calculated reference direction of each boat in accordance with a distance from the front boat. Then, the game apparatus calculates the imaging direction of the virtual camera based on the calculated average direction.

33 Claims, 15 Drawing Sheets

STORAGE MEDIUM HAVING STORED THEREON GAME PROGRAM, AND GAME APPARATUS

CROSS REFERENCE TO RELATED APPLICATION

The disclosure of Japanese Patent Application No. 2009-128805, filed on May 28, 2009, is incorporated herein by reference.

BACKGROUND OF THE INVENTION

1. Field of the Invention

The present invention relates to a storage medium having stored thereon a game program, and a game apparatus, and more particularly, to a storage medium having stored thereon a game program, and a game apparatus, which cause a plurality of objects in a virtual space to be displayed on a display device.

2. Description of the Background Art

Conventionally, there has existed a game apparatus that causes a plurality of objects to be displayed on a display device. For example, Japanese Patent Laid-Open Publication No. H10-165647 discloses a game apparatus that sets the fixation point of a virtual camera at the midpoint between two enemies for displaying the two enemies.

However, the technology described in Japanese Patent Laid-open Publication No. H10-165647 has the following problem. By setting the fixation point of the virtual camera as described above, a plurality of objects appearing in a three-dimensional virtual space can be included in the display range of the display device, but the objects are not necessarily displayed so as to be easily operated by a player.

SUMMARY OF THE INVENTION

Therefore, an object of the present invention is to provide a storage medium having stored thereon a game program, and a game apparatus, which are capable of causing a plurality of objects to be displayed on a display device so as to be easily operated by a player.

The present invention has the following features to solve the problem mentioned above.

One embodiment of the present invention is a storage medium having stored thereon a game program that is executed by a computer of a game apparatus that displays, on a display device, an image of a virtual space that is taken by a virtual camera, a plurality of objects being present in the virtual space. The game program causes the computer to operate as object moving means, average direction calculation means, imaging direction setting means, and display control means. The object moving means moves the plurality of objects in the virtual space. The average direction calculation means calculates, as a reference direction of each object, a direction based on a moving direction and/or a facing direction of each object, and calculates an average direction by performing weighted averaging of the calculated reference directions of the plurality of objects under a first condition. The imaging direction setting means sets an imaging direction of the virtual camera based on the average direction. The display control means displays, based on the imaging direction that is set by the imaging direction setting means, a taken image of the virtual space on the display device.

It is noted that the weighted averaging in the above includes simple averaging.

According to the above, the average direction can be calculated by calculating the reference direction based on the moving direction and/or the facing direction of each object, and performing weighted averaging of the calculated reference direction of each object under the first condition. Then, the imaging direction of the virtual camera can be calculated based on the average direction. Thus, an image that is easily viewable by each player and in which it is easy for each player to perform an operation can be displayed on the display device.

In one embodiment of the present invention, the first condition may be a condition in which, in a game executed by the game program, when the object is in an advantageous situation as compared with the other objects, a weight for the reference direction of the object is increased.

It is noted that the advantageous situation of the object includes a situation in which the game progress of the object is advantageous for the rules of the game as compared to the other objects, and a situation in which a condition provided for the object in the game is advantageous as compared to conditions provided for the other objects.

According to the above, when the object operated by the player is in an advantageous situation, an image can be displayed in which it is easy for the player to perform an operation.

In one embodiment of the present invention, the advantageous situation may be a situation in which at least one of a movement distance, a number of wins, a winning percentage, and a score of the object is greater than that of the other objects.

According to the above, when at least one of the movement distance, the number of wins, the winning percentage, and the score of the object is greater than that of the other objects, an image can be displayed in which it is easy for a player operating the object to perform an operation.

In one embodiment of the present invention, the first condition may be a condition in which, in a game executed by the game program, when the object is in a disadvantageous situation as compared with the other objects, a weight for the reference direction of the object is increased.

It is noted that the disadvantageous situation of the object includes a situation in which the game progress of the object is disadvantageous for the rules of the game as compared to the other objects, and a situation in which a condition provided for the object in the game is disadvantageous as compared to conditions provided for the other objects.

According to the above, when the object operated by a player is in a disadvantageous situation, an image can be displayed in which it is easy for the player to perform an operation.

In one embodiment of the present invention, the disadvantageous situation may be a situation in which at least one of a movement distance, a number of wins, a winning percentage, and a score of the object is less than that of the other objects.

According to the above, when at least one of the movement distance, the number of wins, the winning percentage, and the score of the object is less than that of the other objects, an image can be displayed in which it is easy for a player operating the object to perform an operation.

In one embodiment of the present invention, the game program may further cause the computer to operate as average position calculation means and fixation point setting means. The average position calculation means calculates an average position by performing, under a second condition, weighted averaging of positions based on positions of the plurality of objects. The fixation point setting means sets a fixation point of the virtual camera based on the average position. Based on the fixation point that is set by the fixation point setting means, the display control means displays a taken image of the virtual space on the display device.

According to the above, the fixation point of the virtual camera can be calculated by performing, under the second condition, weighted averaging of the position based on the position of each object. Thus, an image that is easily viewable by each player and in which it is easy for each player to perform an operation can be displayed on the display device.

In one embodiment of the present invention, the game program may further cause the computer to operate as set position calculation means. The set position calculation means calculates a set position of each object based on the position of each object. The average position calculation means calculates the average position by performing, under the second condition, weighted averaging of each set position that is calculated by the set position calculation means.

According to the above, the fixation point of the virtual camera can be calculated by calculating, based on the position of each object, the set position for each object, and performing, under the second condition, weighted averaging of each set position. Thus, an image that is easily viewable by each player and in which it is easy for each player to perform an operation can be displayed on the display device.

In one embodiment of the present invention, based on the reference direction and the position of each object, the set position calculation means may calculate a set position for each object.

According to the above, the set position of each object can be calculated based on not only the position of each object but also the reference direction of each object.

In one embodiment of the present invention, the second condition may be a condition in which, in a game executed by the game program, when the object is in an advantageous situation as compared with the other objects, a weight for the set position of the object is increased.

According to the above, when the object operated by a player is in an advantageous situation, the fixation point of the virtual camera gets close to the object. Thus, an image can be displayed that is easily viewable by the player operating the object in the advantageous situation and in which it is easy for this player to perform an operation.

In one embodiment of the present invention, the advantageous situation may be a situation in which at least one of a movement distance, a number of wins, a winning percentage, and a score of the object is greater than that of the other objects.

According to the above, when at least one of the movement distance, the number of wins, the winning percentage, and the score of the object is greater than that of the other objects, the fixation point of the virtual camera gets close to the object. Thus, an image can be displayed in which it is easy for a player operating the object to perform an operation.

In one embodiment of the present invention, the second condition may be a condition in which, in a game executed by the game program, when the object is in a disadvantageous situation as compared with the other objects, a weight for the set position of the object is increased.

According to the above, when the object operated by a player is in a disadvantageous situation, the fixation point of the virtual camera gets close to the object. Thus, an image can be displayed that is easily viewable by the player operating the object in the disadvantageous situation and in which it is easy for this player to perform an operation.

In one embodiment of the present invention, the disadvantageous situation may be a situation in which at least one of a movement distance, a number of wins, a winning percentage, and a score of the object is less than that of the other objects.

According to the above, when at least one of the movement distance, the number of wins, the winning percentage, and the score of the object is less than that of the other objects, the fixation point of the virtual camera gets close to the object. Thus, an image can be displayed in which it is easy for a player operating the object to perform an operation.

In one embodiment of the present invention, the game program may further cause the computer to operate as protruding degree calculation means. The protruding degree calculation means calculates a protruding degree to which at least one of the plurality of objects protrudes from an imaging range of the virtual camera. The display control means enlarges or reduces the imaging range in accordance with the protruding degree that is calculated by the protruding degree calculation means, and displays a taken image of the virtual space on the display device.

According to the above, when a plurality of objects do not fall within the imaging range, the imaging range can be enlarged, and when a plurality of objects fall within the imaging range, the imaging range can be reduced.

In one embodiment of the present invention, the display control means may enlarge or reduce the imaging range by moving, in accordance with the protruding degree that is calculated by the protruding degree calculation means, the virtual camera in the imaging direction or in a direction opposite to the imaging direction.

According to the above, the fixation point distance can be set in accordance with the protruding degree. Thus, the imaging range can be enlarged or reduced.

In one embodiment of the present invention, the game program may further cause the computer to operate as forward direction calculation means and object moving direction correction means. The forward direction calculation means calculates forward directions that are directions in which the plurality of objects should move. The object moving direction correction means corrects a moving direction of each object based on the forward directions of each object.

According to the above, the forward direction of each object can be calculated, and the moving direction of each object can be corrected based on the forward direction of each object.

In one embodiment of the present invention, the game program may further cause the computer to operate as external force generation means. The external force generation means generates external forces in the forward directions calculated by the forward direction calculation means, with respect to the plurality of objects. The object moving direction correction means corrects the moving direction of each object by applying, to each object, the external force generated by the external force generation means.

According to the above, an external force in the forward direction of the object can be generated with respect to the object. Thus, the object can move easily in the direction in which the object should move.

In one embodiment of the present invention, at least one input device may be connected to the game apparatus, and the object moving means may move at least one of the plurality of objects based on an input from the input device.

According to the above, the object can be moved based on an input from the input device.

In one embodiment of the present invention, the input device may be connected to the game apparatus so as to be associated with each of the plurality of objects.

According to the above, a plurality of input devices can be associated with a plurality of objects, respectively, and a plurality of players can play a game.

In one embodiment of the present invention, the game executed by the game program may be a game to compete in quickly reaching a predetermined position in the virtual space, and a situation in which the object is closer to the predetermined position in the virtual space may be determined to be an advantageous situation for rules of the game.

According to the above, an object that is closer to the predetermined position is determined to be in an advantageous situation.

In one embodiment of the present invention, the average direction calculation means may calculate an average direction by performing, under the first condition, weighted averaging of each reference direction calculated by combining a moving direction and a facing direction of each object at a predetermined rate.

According to the above, the reference direction of an object can be calculated by combining the moving direction and the facing direction of the object.

In one embodiment of the present invention, the game program may further cause the computer to operate as forward direction calculation means. The forward direction calculation means calculates forward directions that are directions in which the plurality of objects should move. The average direction calculation means sets a weight for the reference direction of each object in accordance with an angle between the reference direction of each object and the forward direction of each object that is calculated by the forward direction calculation means.

According to the above, when the average direction is calculated, a weight for the reference direction of an object can be set in accordance with the angle between the forward direction and the reference direction of the object.

In one embodiment of the present invention, the average direction calculation means may set a weight for the reference direction of the object so as to be greater when an angle between the forward direction and the reference direction of the object is smaller.

According to the above, the weight can be greater when the angle is smaller. Thus, an image can be displayed in which it is easy for a player, operating an object whose forward direction and reference direction agree with each other, to perform an operation.

In one embodiment of the present invention, the game program may further cause the computer to operate as forward direction calculation means. The forward direction calculation means calculates forward directions that are directions in which the plurality of objects should move. The average direction calculation means calculates an average direction by performing, under the first condition, weighted averaging of the reference directions of the plurality of objects and a direction obtained by averaging the forward directions of the plurality of objects.

According to the above, when the average direction is calculated, not only the reference direction of each object but also the direction obtained by averaging the forward direction of each object can be taken into consideration. Thus, the average direction can be caused to get close to an average forward direction to some extent. For example, in a game in which a plurality of objects move on a course, the average direction can be caused to get close to the course forward direction to some extent.

One embodiment of the present invention is a storage medium having stored thereon a game program that is executed by a computer of a game apparatus that displays, on a display device, an image of a virtual space that is taken by a virtual camera, a plurality of objects being present in the virtual space. The game program causes the computer to operate as object moving means, set position calculation means, average position calculation means, fixation point setting means, and display control means. The object moving means moves the plurality of objects in the virtual space. The set position calculation means sets, as a reference direction of each object, a direction based on a moving direction and/or a facing direction of each object, and calculates a set position based on the reference direction and a position of each object. The average position calculation means calculates an average position by performing, under a predetermined condition, weighted averaging of each set position calculated by the set position calculation means. The fixation point setting means sets a fixation point of the virtual camera based on the average position. The display control means displays, based on the fixation point that is set by the fixation point setting means, a taken image of the virtual space on the display device.

According to the above, the fixation point of the virtual camera can be calculated by performing, under the predetermined condition, weighted averaging of each set position calculated based on the reference direction and the position of each object. Thus, the fixation point of the virtual camera can be set, and a plurality of objects can be displayed so as to be clearly visible.

One embodiment of the present invention may be implemented in the form of a game apparatus executing the above game program.

According to one embodiment of the present invention, an average direction can be calculated by performing, under a first condition, weighted averaging of the reference direction of each object that is calculated based on the moving direction and/or the facing direction of each object. Then, the imaging direction of the virtual camera can be calculated based on the average direction. Thus, an image that is easily viewable by each player and in which it is easy for each player to perform an operation can be displayed on a display device.

These and other objects, features, aspects and advantages of the present invention will become more apparent from the following detailed description of the present invention when taken in conjunction with the accompanying drawings.

DESCRIPTION OF THE PREFERRED EMBODIMENTS

[Entire Configuration of Game System]

Figure 1:
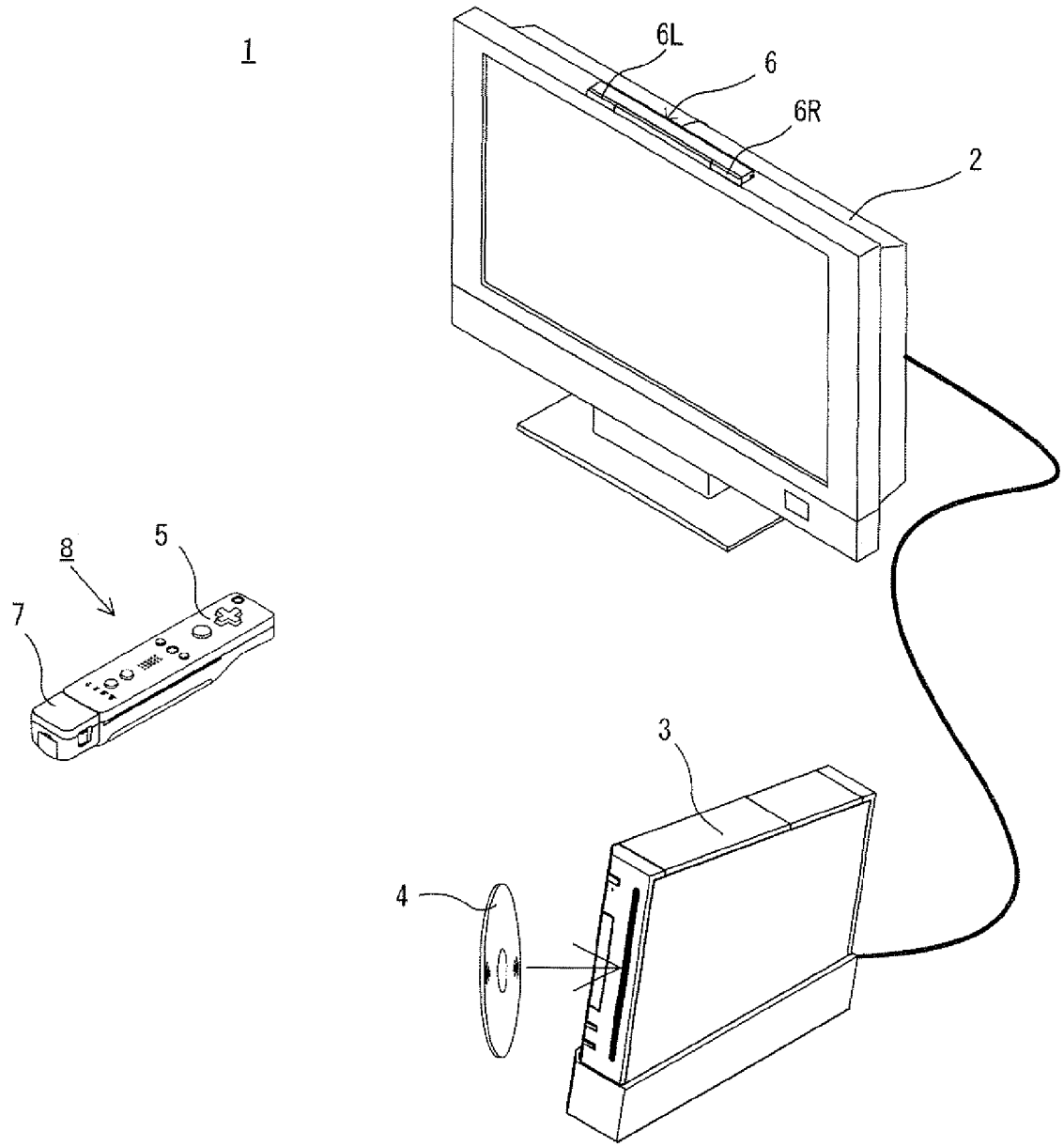
FIG. 1 is an external view of a game system 1.

With reference to FIG. 1, the following will describe a game system 1 including a game apparatus according to an embodiment of the present invention. FIG. 1 is an external view of the game system 1. Hereinafter, a game apparatus and a game program according to the present embodiment will be described, using a stationery game apparatus as an example. As shown in FIG. 1, the game system 1 includes a television receiver (hereinafter, referred to merely as a television) 2, a game apparatus 3, an optical disc 4, an input device 8, and a marker section 6. The game system 1 executes game processing at the game apparatus 3 in accordance with a game operation performed using the input device 8.

The optical disc 4 as an example of an exchangeable information storage medium replaceably used with respect to the game apparatus 3 is detachably inserted in the game apparatus 3. The optical disc 4 stores a game program that is to be executed by the game apparatus 3. The game apparatus 3 has at its front surface an insertion slot for the optical disc 4. The game apparatus 3 reads and executes the game program stored in the optical disc 4, which is inserted in the insertion slot, for executing the game processing.

The television 2 as an example of a display device is connected to the game-apparatus 3 via a connection cord. The television 2 displays game images that are obtained as the result of the game process executed by the game apparatus 3. The marker section 6 is mounted adjacent to the screen of the television 2 (on the upper side of the screen in FIG. 1). The marker section 6 has a marker 6R and a marker 6L at its opposite ends, respectively. The marker 6R has one or more infrared LEDs that output infrared lights forward from the television 2. The marker 8L has the same configuration as the marker 6R. The marker section 6 is connected to the game apparatus 3, and the game apparatus 3 is capable of controlling illumination of each infrared LED of the marker section 6.

The input device 8 serves to provide the game apparatus 3 with operation data that indicates contents of an operation performed with respect to the input device 8. In the present embodiment, the input device 8 includes a controller 5 and a gyro-sensor unit 7. Although described later, the gyro-sensor unit 7 is detachably connected to the controller 5 in the input device 8. The controller 5 is connected to the game apparatus 3 by wireless communication. In the present embodiment, the technology of, for example, Bluetooth (registered trademark) is used for the wireless communication between the controller 5 and the game apparatus 3. It is noted that in an alternative embodiment, the controller 5 may be connected to the game apparatus 3 via a wire.

[Internal Configuration of Game Apparatus 3]

Figure 2:
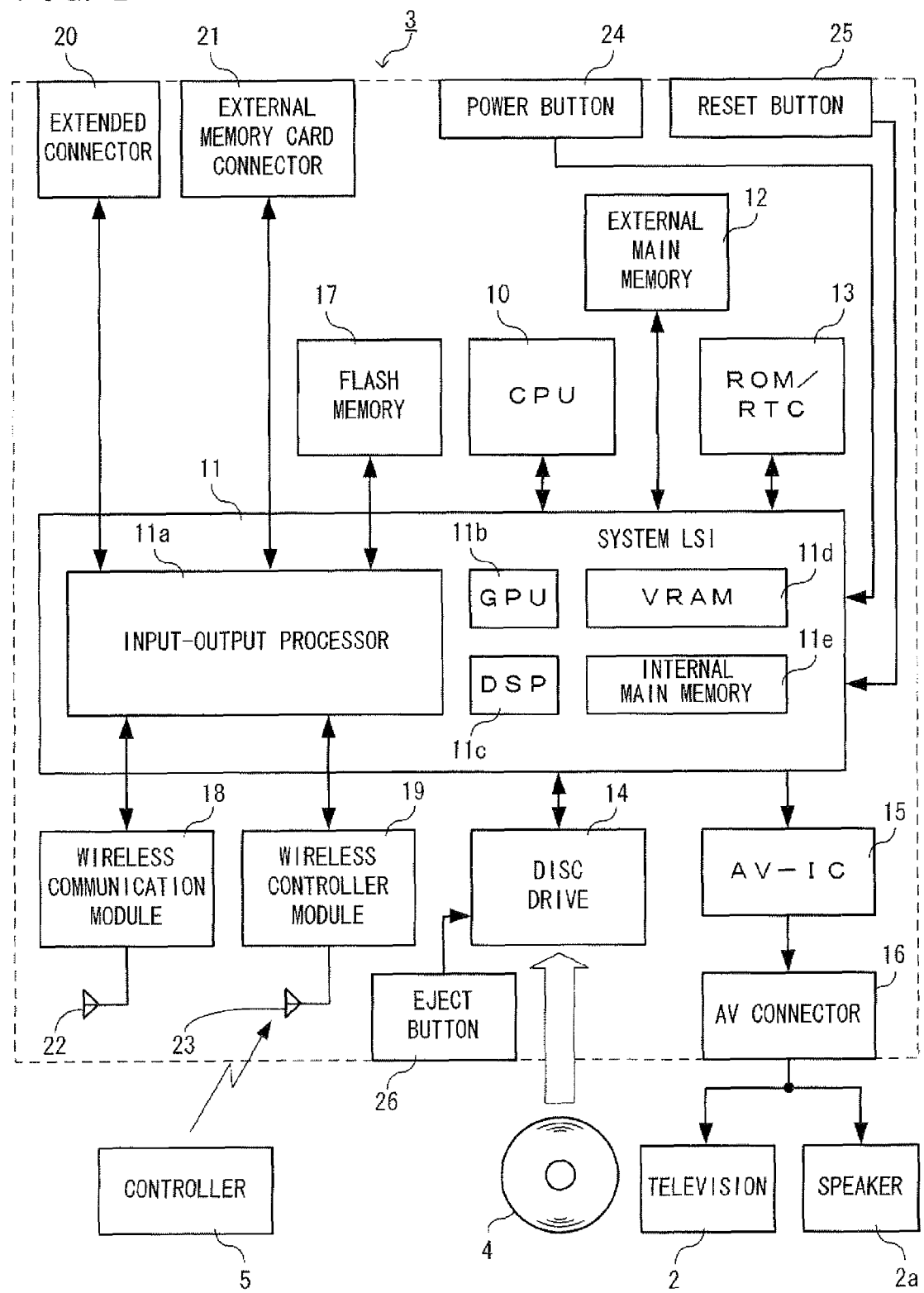
FIG. 2 is a block diagram showing a configuration of a game apparatus 3.

The following will describe an internal configuration of the game apparatus 3 with reference to FIG. 2. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as: control of data transfer between the system LSI 11 and each component connected to the system LSI 11; generation of an image to be displayed; obtaining data from an external apparatus; and the like. An internal configuration of the system LSI 11 will be described later. The volatile external main memory 12 stores various data and programs such as the game program read from the optical disc 4, a game program read from a flash memory 17, and the like, and is used as a work region and a buffer region for the CPU 10. The ROM/RTC 13 includes a ROM (so-called boot ROM) that stores a program for starting up the game apparatus 3, and a clock circuit (RTC: Real Time Clock) for counting time. The disc drive 14 reads program data and texture data from the optical disc 4, and writes these data into a later-described internal main memory 11e or the external main memory 12.

The system LSI 11 is provided with an input-output processor (I/O processor) 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of drawing means, and generates an image according to a graphics command (command for generating graphics) from the CPU 10. The VRAM 11d stores data, such as polygon data and texture data, which are required for the GPU 11b to execute the graphics command. In generating an image, the GPU 11d generates image data using the data stored in the VRAM 11d.

The DSP 11c functions as an audio processor, and generates audio data using sound data and sound waveform (tone color) data that are stored in the internal main memory 11e and the external main memory 12.

The image data and the sound data generated thus are read by the AV-IC 15. The AV-IC 15 outputs the image data to the television 2 via an AV connector 16, and the sound data to speaker 2a built in the television 2. Thus, an image is displayed on the television 2, and sound is outputted from the speaker 2a.

The input-output processor 11a performs transmission and reception of data to and from each component connected to the input-output processor 11a, and downloads data from an external apparatus. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus 3 and the other game apparatus and various servers, the flash memory 17 may store saved data (result data or midstream data of a game) of the game played using the game apparatus 3.

The input-output processor 11a receives operation data transmitted from the controller 5 via the antenna 23 and the wireless controller module 19, and stores (temporarily stores) the operation data in the buffer region of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium via the extended connector 20 and the memory card connector 21 for storing data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

[Configuration of Input Device 8]

Figure 3:
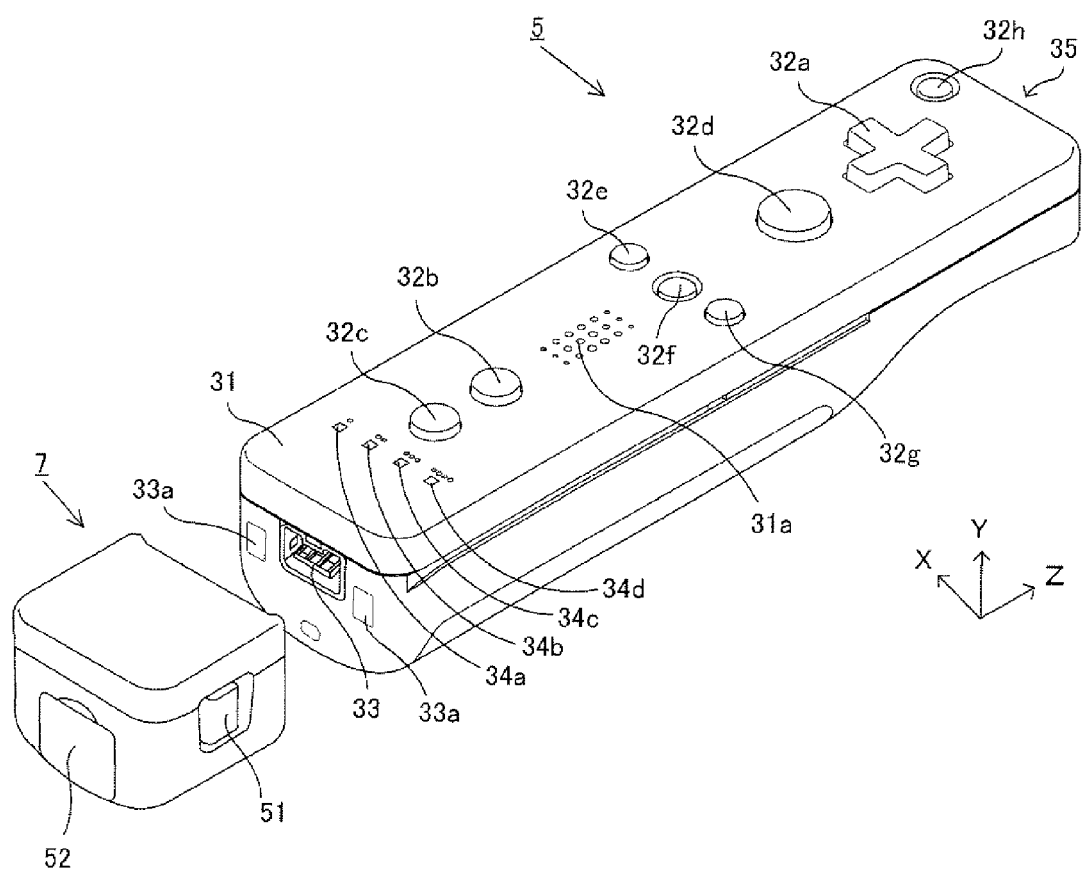
FIG. 3 is a perspective view showing an external configuration of an input device 8.
Figure 4:
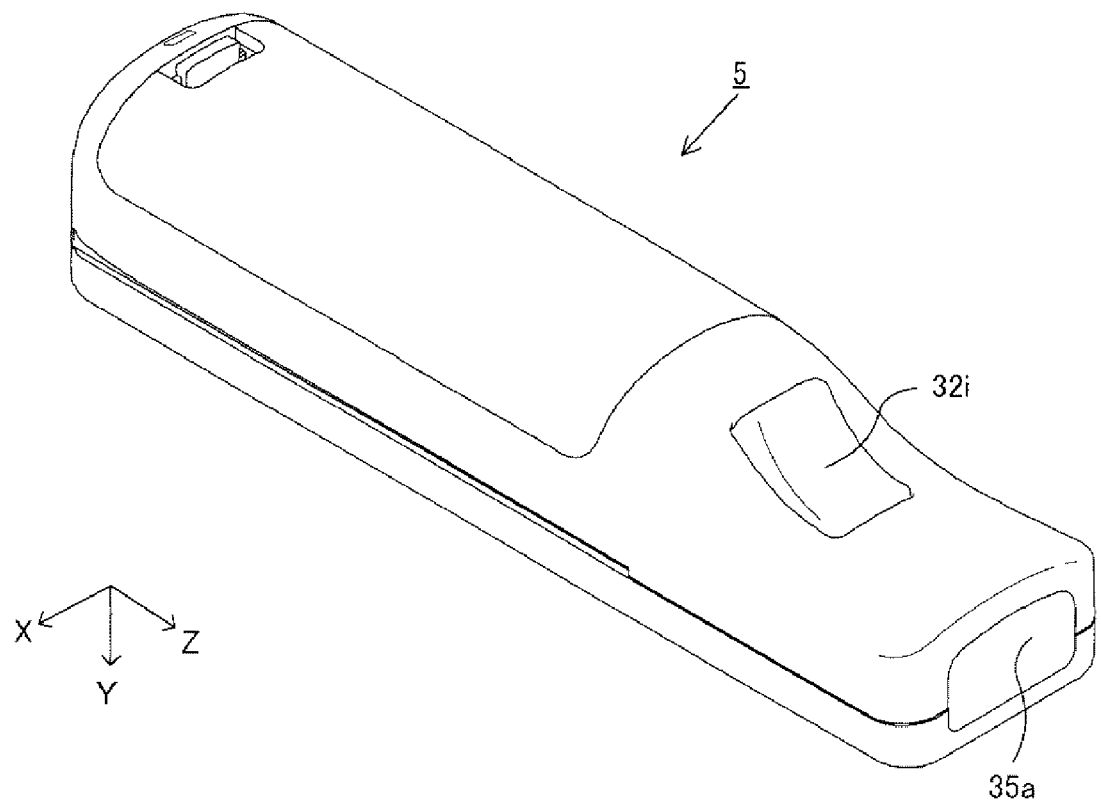
FIG. 4 is a perspective view of a controller 5 seen from a bottom front side thereof.

The following will describe the input device 8 with reference to FIGS. 3 to 6. FIG. 3 is a perspective view of the input device 8, and FIG. 4 is a perspective view of the controller 5 seen from a bottom front side thereof.

Referring to FIGS. 3 and 4, the controller 5 includes a housing 31 formed, for example, by plastic molding. The housing 31 has a generally parallelepiped shape extending in a longitudinal direction from front to rear (in Z-axis direction shown in FIG. 3). The overall size of the housing 31 is small enough to be held by one hand of an adult or even a child. The player can perform a game operation by pressing a button provided in the controller 5, or by moving the controller 5 to change its position and orientation.

The housing 31 is provided with a plurality of operation buttons. As shown in FIG. 3, a cross button 32a, a number one button 32b, a number two button 32c, an A button 32d, a minus button 32e, a home button 32f, a plus button 32g, and a power button 32h are provided on a top surface of the housing 31. In the present specification, the top surface of the housing 31 on which these buttons 32a to 32h may be referred to as "button surface". On the other hand, as shown in FIG. 4, a recessed portion is formed on a bottom surface of the housing 31. On a slope surface of the recessed portion and at the rear side thereof, a B button 32i is provided. Functions according to the game program executed by the game apparatus 3 are appropriately assigned to these operation buttons 32a to 32i. The power button 32h is a power switch for turning on and off the game apparatus 3 by remote control. The home button 32f and the power button 32h have top surfaces thereof buried in the top surface of the housing 31. This prevents the player from inadvertently pressing the home button 32f or the power button 32h.

On a rear surface of the housing 31, a connector 33 is provided. The connector 33 is used for connecting another device (e.g. the gyro-sensor unit 7, and another controller) to the controller 5. In the rear surface of the housing 31 and on both sides of the connector 33, engagement holes 33a are provided for preventing the above other device from being easily disconnected.

On the rear side of the top surface of the housing 71, a plurality (four in FIG. 3) of LEDs 34a to 34d are provided. Here, a controller type (number) is assigned to the controller 5 such that the controller 5 is distinguishable from other main controllers. The LEDs 34a to 34d are used for informing the player of the controller type that is currently set for the controller 57, informing the player of a remaining battery power of the controller 5, and the like. Specifically, one of the plurality of LEDs 34a to 34d according to the above controller type is lit up when a game operation is performed using the controller 5.

The controller 5 has an imaging information calculation section 35 (FIG. 6), and a light incident surface 35a of the imaging information calculation section 35 is provided on a front surface of the housing 31 as shown in FIG. 4. The light incident surface 35a is formed from a material that allows at least the infrared lights from the markers 6R and 6L to pass therethrough.

Between the number one button 32b and the home button 32f on the top surface of the housing 31, a plurality of holes 31a is provided for outputting sound from a speaker 49 (FIG. 5) built in the controller 5 to the outside therethrough.

Figure 5:
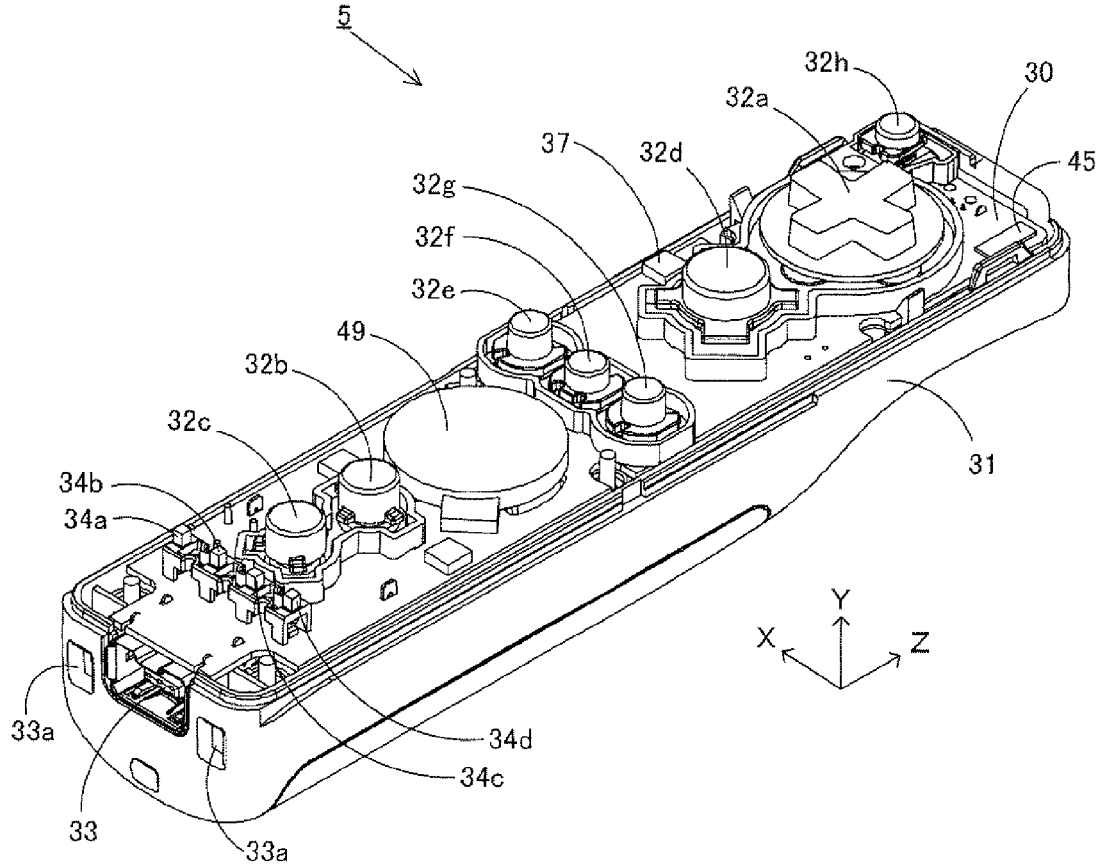
FIG. 5 is a perspective view of the controller 5 in a state where an upper housing (a part of a housing 31) thereof is removed.
Figure 6:
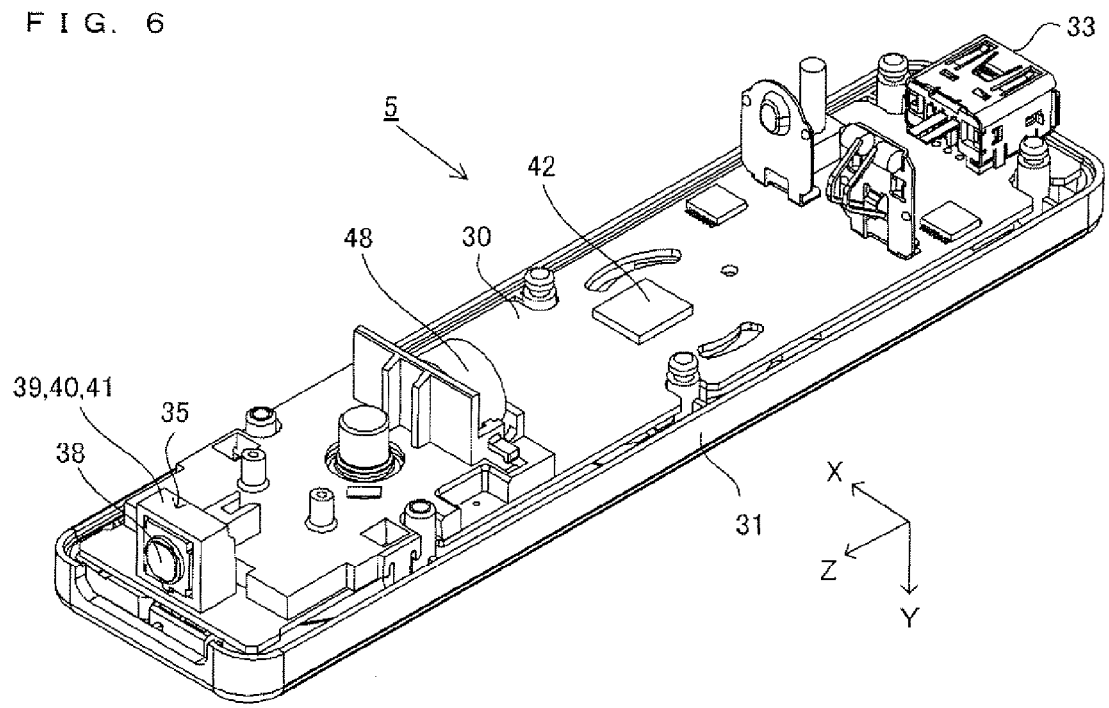
FIG. 6 is a perspective view of the controller 5 in a state where a lower housing (a part of the housing 31) thereof is removed.

The following will describe an internal configuration of the controller 5 with reference to FIGS. 5 and 6. FIGS. 5 and 6 are perspective views of the controller 5 showing its internal configuration. FIG. 5 is a perspective view of the controller 5 in a state where an upper housing (a part of the housing 31) thereof is removed. FIG. 6 is a perspective view of the controller 5 in a state where a lower housing (a part of the housing 31) thereof is removed. FIG. 6 shows a reverse side of a substrate 30 shown in FIG. 5.

Referring to FIG. 5, the substrate 30 is fixed inside the housing 31. On a top main surface of the substrate 30, the operation buttons 32a to 32h, the LEDs 34a to 34d, an acceleration sensor 37, and an antenna 45, the speaker 49, and the like are provided. These components are connected to a microcomputer 42 (see FIG. 6) via lines (not shown) formed on the substrate 30 and the like. In the present embodiment, the acceleration sensor 37 is located at a position offset from the center of the controller 5 in X-axis direction. This facilitates calculating a movement of the controller 5 in rotating the controller 5 about Z-axis. In addition, the acceleration sensor 37 is located in the front portion of the controller 5 in the longitudinal direction (the Z-axis direction). The controller 5 function as a wireless controller by a wireless module 44 (FIG. 7) and the antenna 45.

Referring to FIG. 6, at a front edge of a bottom main surface of the substrate 30, the imaging information calculation section 35 is provided. The imaging information calculation section 35 includes an infrared filter 38, a lens 39, an image pickup element 40, and an image processing circuit 41. These components 38 to 41 are located in this order from the front surface of the controller 5, and mounted on the bottom main surface of the substrate 30.

Further, on the bottom main surface of the substrate 30, the microcomputer 42 and a vibrator 48 are provided. The vibrator 48 is, for example, a vibration motor or a solenoid, and connected to the microcomputer 42 via a line formed on the substrate 30 and the like. The vibrator 48 is actuated according to a command from the microcomputer 42 to vibrate the controller 5. Thus, the vibration is conveyed to the player holding the controller 5, and a so-called vibration-feedback game is realized. In the present embodiment, the vibrator 48 is located in the front portion of the housing 31. In other words, the vibrator 48 is located closer to an end side of the controller 5 than to the center of the controller 5. Thus, the controller 5 is substantially vibrated by the vibration of the vibrator 48. The connector 33 is mounted to the rear edge of the bottom main surface of the substrate 30. It is noted that in addition to the components shown in FIGS. 5 and 6, the controller 5 includes a crystal oscillator for generating a basic clock of the microcomputer 42, an amplifier for outputting a sound signal to the speaker 49, and the like.

The gyro-sensor unit 7 includes a gyro-sensor (gyro-sensors 55 and 56 shown in FIG. 7) that detects angular velocities about three axes. The gyro-sensor unit 7 is detachably connected to the connector 33 of the controller 5. On a front end (an end on the Z-axis positive direction side shown in FIG. 3) of the gyro-sensor unit 7, a plug (plug 53 shown in FIG. 7) connectable to the connector 33 is provided. Further, hooks (not shown) are provided on both sides of the plug 53. In a state where the gyro-sensor unit 7 is mounted to the controller 5, the plug 53 is connected to the connector 33 and the hooks engage the engagement holes 33a of the controller 7. Thus, the controller 5 and the gyro-sensor unit 7 are firmly fixed to each other. Further, the gyro-sensor unit 7 has two buttons 51 on both side surfaces (surfaces in the X-axis direction shown in FIG. 3), respectively. The buttons 51 are configured such that when the buttons 51 are pressed, the engaging state of the hooks with respect to the engagement holes 33a is released. Thus, by pulling the plug 53 from the connector 33 with the buttons 51 pressed, the gyro-sensor unit 7 is detached from the controller 5.

On a rear end of the gyro-sensor unit 7, a connector with the same shape as that of the above connector 33 is provided. Thus, another device attachable to the controller 5 (connector 33) is also attachable to the connector of the gyro-sensor unit 7. In FIG. 3, a cover 52 for this connector is detachably mounted to the gyro-sensor unit 7.

It is noted that the shapes of the controller 5 and the gyro-sensor unit 7, the shape of each operation button, and the numbers and the installed positions of the acceleration sensor and the vibrator as shown in FIGS. 3 to 6 are merely an example, and the present invention can be achieved with other shapes, other numbers, and other installed positions. Although an imaging direction of imaging means is a Z-axis positive direction in the present embodiment, the imaging direction may be any direction. In other words, the imaging information calculation section 35 (the light incident surface 35a of the imaging information calculation section 35) does not have to be located in the front surface of the housing 31 of the controller 5, and may be provided in another surface as long as light can be taken from outside the housing 31.

Figure 7:
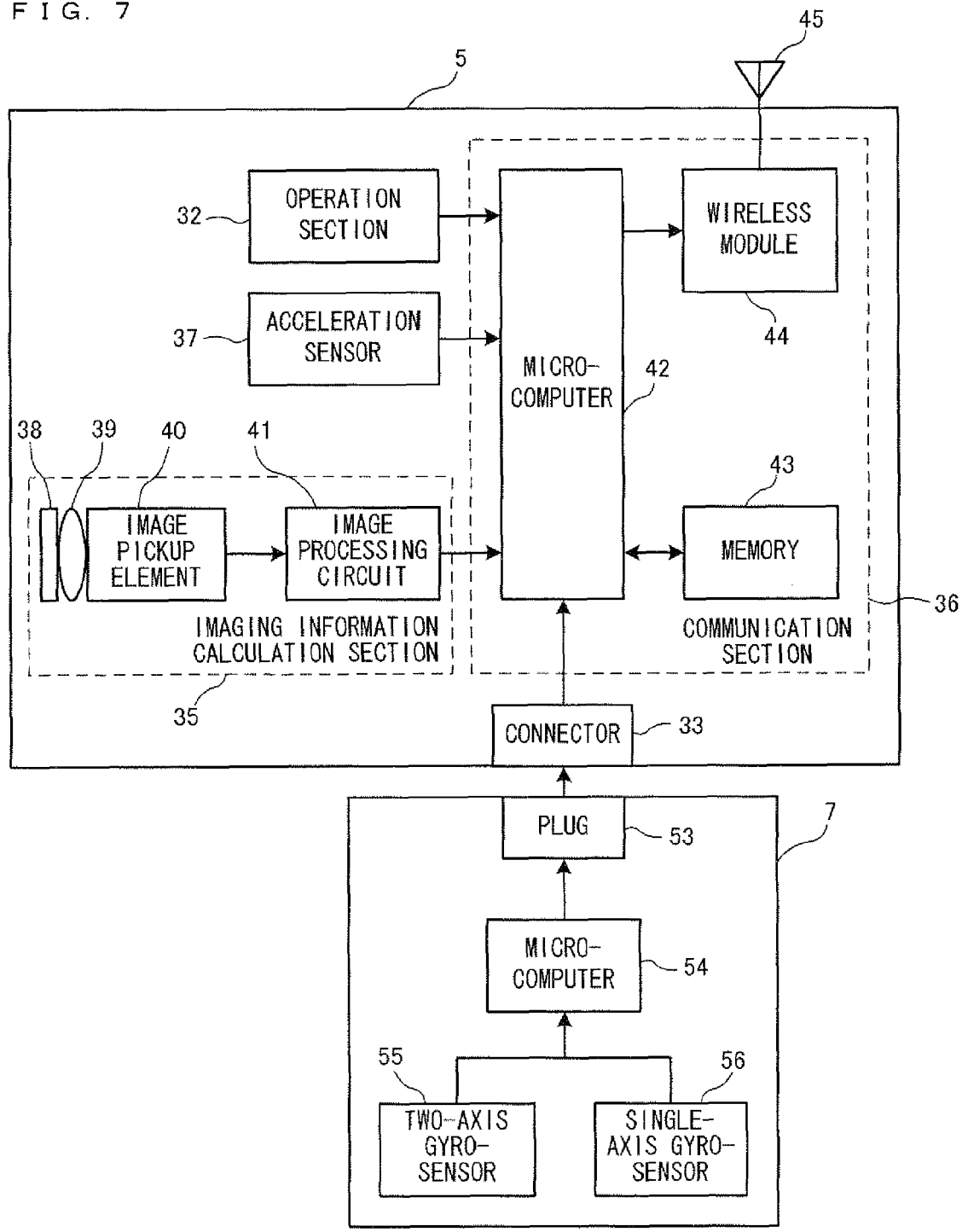
FIG. 7 is a block diagram showing a configuration of the input device 8.

FIG. 7 is a block diagram showing a configuration of the input device 8 (the controller 5 and the gyro-sensor unit 7). The controller 5 includes an operation section 32 (the operation buttons 32a to 32i), the connector 33, the imaging information calculation section 35, a communication section 36, and the acceleration sensor 37. The controller 5 transmits, to the game apparatus 3, data that indicates contents of an operation performed with respect to the controller 5 as operation data.

The operation section 32 includes the operation buttons 32a to 32i, and outputs, to the microcomputer 42 of the communication section 36, operation button data that indicates an input state with respect to each of the operation buttons 32a to 32i (whether or not each of the operation buttons 32a to 32i is pressed).

The imaging information calculation section 35 is a system for analyzing image data of an image taken by the imaging means, thereby identifying an area having a high brightness in the image and detecting the position of the center of gravity, the size and the like of the area. The imaging information calculation section 35 has, for example, a maximum sampling period of about 200 frames/sec, and therefore can trace and analyze even a relatively fast motion of the controller 5.

The imaging information calculation section 35 includes the infrared filter 38, the lens 39, the image pickup element 40, and the image processing circuit 41. The infrared filter 38 allows, among incident lights on the front of the controller 5, only an infrared light to pass therethrough. The lens 39 converges the infrared light that has passed through the infrared filter 38, and causes the infrared light to be incident on the image pickup element 40. The image pickup element 40 is a solid-state image pickup element such as a CMOS sensor or a CCD. The image pickup element 40 receives the infrared light collected by the lens 39, and outputs an image signal. Here, the markers 6R and 6L of the marker section 6 that are located adjacent to the screen of television 2 have the infrared LEDs that output infrared lights forward from the television 2. The provision of the infrared filter 38 allows the image pickup element 40 to receive only the infrared light that has passed through the infrared filter 38 to generate image data, thereby more accurately taking an image of the markers 6R and 6L. Hereinafter, an image taken by the image pickup element 40 is referred to as a taken image. The image data generated by the image pickup element 40 is processed by the image processing circuit 41. The image processing circuit 41 calculates the position, in a taken image, of an imaging target (the markers 6R and 6L). The image processing circuit 41 outputs a coordinate indicative of the calculated position to the microcomputer 42 of the communication section 36. The data of the coordinate is transmitted as operation data by the microcomputer 42 to the game apparatus 3. Hereinafter, the coordinate is referred to as a "marker coordinate". The marker coordinate changes in response to the facing direction (inclination angle) and the position of the controller 5. Thus, the game apparatus 3 can calculate the facing direction and the position of the controller 5 using the marker coordinate.

It is noted that in an alternative embodiment, the controller 5 may not have the image processing circuit 41, and a taken image may be transmitted from the controller 5 to the game apparatus 3. In this case, the game apparatus 3 may have a circuit or a program having the same function as that of the image processing circuit 41, and may calculate the above marker coordinate.

The acceleration sensor 37 detects acceleration (including gravitational acceleration) of the controller 5, namely, a force (including the force of gravity) applied to the controller 5. The acceleration sensor 37 detects a value of linear acceleration in a sensing axis direction among acceleration applied to the detection portion of the acceleration sensor 37. For example, in the case of a multi-axis (two-axis or more) acceleration sensor, the acceleration sensor detects acceleration of a component along each axis, as acceleration applied to the detection portion of the acceleration sensor. As a non-limiting example, a three-axis or two-axis acceleration sensor may be of the type available from Analog Devices, Inc. or STMicroelectronics N.V. It is noted that the acceleration sensor 37 may be, for example, an acceleration sensor of electrostatic capacitance type, or an acceleration sensor of another type.

In the present embodiment, the acceleration sensor 37 detects linear acceleration of the controller 5 in three axial directions of the controller 5, i.e., an up-down direction (Y-axis direction shown in FIG. 3), a left-right direction (the X-axis direction shown in FIG. 3), and a front-rear direction (the Z-axis direction shown in FIG. 3) of the controller 5. The acceleration sensor 37 serves to detect linear acceleration along each axis, and thus the output of the acceleration sensor 37 represents a value of linear acceleration along each of the three axes. In other words, the detected acceleration is represented as a three-dimensional vector (ax, ay, az) in an XYZ coordinate system that is set with the input device 8 (controller 5) as a reference. Hereinafter, a vector including, as a component, an acceleration value for each of the three axes that is detected by the acceleration sensor 37 is referred to as an acceleration vector.

Data (acceleration data) that indicates the acceleration detected by the acceleration sensor 37 is outputted to the communication section 36. It is noted that since the acceleration detected by the acceleration sensor 37 changes in response to the facing direction (inclination angle) and movement of the controller 5, the game apparatus 3 can calculate the facing direction and the movement of the controller 5 using the acceleration data. In the present embodiment, the game apparatus 3 determines the orientation of the controller 5 based on the acceleration data and later-described angular velocity data.

Data (acceleration data) that indicates the acceleration (acceleration vector) detected by the acceleration sensor 37 is outputted to the communication section 36. In the present embodiment, the acceleration sensor 37 is used as a sensor that outputs data for determining the inclination angle of the controller 5.

It is noted that, through processing by a computer such as the processor of the game apparatus 3 (e.g. the CPU 10) or the processor of the controller 5 (e.g. the microcomputer 42) based on the acceleration signals outputted from the acceleration sensor 37, additional information relating to the controller 5 can be inferred or calculated, as one skilled in the art will readily understand from the description herein. For example, when the processing is performed by the computer on the assumption that the controller 5 provided with the acceleration sensor 37 is in static state (i.e. when the processing is performed while only gravitational acceleration is detected by the acceleration sensor 37), if the controller 5 is actually in static state, the detected acceleration is used to determine whether or not the controller 5 is inclined relative to the direction of gravity or how many degrees the controller 5 is inclined relative to the direction of gravity. Specifically, when a state where the detection axis of the acceleration sensor 37 extends in a vertically-down direction is set as a reference state, it is possible to determine whether or not the controller 5 is inclined with respect to the vertically downward direction, only by determining whether 1 G (gravitational acceleration) is applied in the direction of the detection axis of the acceleration sensor 37. It is also possible to determine how many degrees the controller 5 is inclined with respect to the vertically downward direction by determining the magnitude of the acceleration applied in the above detection axis direction. In addition, in the case where the acceleration sensor 37 is capable of detecting acceleration in multi-axis directions, it is possible to determine in detail how many degrees the controller 5 is inclined relative to the direction of gravity through processing of a signal of acceleration detected for each axis. In this case, a processor may perform processing based on the output from the acceleration sensor 37 for calculating the inclination angle of the controller 5, or for calculating the inclination direction of the controller 5 without calculating the inclination angle. As described above, the acceleration sensor 37 is used in combination with the processor to determine inclination, attitude or position of the controller 5.

On the other hand, on the assumption that the controller 5 is in dynamic state (the controller 5 is moved), the acceleration sensor 37 detects acceleration corresponding to motion of the controller 5 in addition to the gravitational acceleration. Thus, it is possible to determine the direction of the motion of the controller 5 by eliminating the gravitational acceleration component from the detected acceleration through predetermined processing. Even on the assumption that the controller 5 is in dynamic state, it is possible to determine inclination of the controller 5 relative to the direction of gravity by eliminating acceleration corresponding to motion of the acceleration sensor 37 from the detected acceleration through predetermined processing. In an alternative embodiment, the acceleration sensor 37 may include an embedded signal processor or other type of a dedicated processor for performing any desired processing of the acceleration signals outputted from accelerometers therein prior to outputting signals to the microcomputer 42. For example, the embedded or dedicated processor could convert an acceleration signal into a corresponding inclination angle (or another suitable parameter) when the acceleration sensor 37 is intended to detect static acceleration (i.e., gravitational acceleration).

The communication section 36 includes the microcomputer 42, a memory 43, the wireless module 44, and the antenna 45. The microcomputer 42 controls the wireless module 44 for wirelessly transmitting, to the game apparatus 3, data obtained by the microcomputer 42 while using the memory 43 as a storage area during processing. The microcomputer 42 is connected to the connector 33. Data transmitted from the gyro-sensor unit 7 is inputted to the microcomputer 42 via the connector 33. The following will describe a configuration of the gyro-sensor unit 7.

The gyro-sensor unit 7 includes the plug 53, a microcomputer 54, the two-axis gyro-sensor 55, and the single-axis gyro-sensor 56. As described above, the gyro-sensor unit 7 detects angular velocities about three axes (X-axis, Y-axis, and Z-axis in the present embodiment), and transmits, to the controller 5, data (angular velocity data) indicative of the detected angular velocities.

The two-axis gyro-sensor 55 detects an angular velocity about X-axis and an angular velocity about Y-axis (per unit time). The single-axis gyro-sensor 56 detects an angular velocity about Z-axis (per unit time). In the present specification, the imaging direction (the Z-axis positive direction) of the controller 5 is set as a reference, and directions of rotation about Z-axis, X-axis, and Y-axis are referred to as a roll direction, a yaw direction, and a pitch direction, respectively. In other words, the two-axis gyro-sensor 55 detects angular velocities in the pitch direction (the direction of rotation about X-axis) and the yaw direction (the direction of rotation about Y-axis), and the single-axis gyro-sensor 56 detects an angular velocity in the roll direction (the direction of rotation about Z-axis).

In the present embodiment, the two-axis gyro-sensor 55 and the single-axis gyro-sensor 56 are used for detecting angular velocities about three axes. In an alternative embodiment, any number and any combination of gyro-sensors may be used as long as angular velocities about three axes are detected.

In the present embodiment, the three axes about which angular velocities are detected by the gyro-sensors 55 and 56 are set so as to agree with the three axes (X-axis, Y-axis, and Z-axis) for which acceleration is detected by the acceleration sensor 37. In an alternative embodiment, the three axes about which angular velocities are detected by the gyro-sensors 55 and 56 may not agree with the three axes (X-axis, Y-axis, and Z-axis) for which acceleration is detected by the acceleration sensor 37.

Data indicative of angular velocities detected by each of the gyro-sensors 55 and 56 is outputted to the microcomputer 54. This means that data indicative of angular velocities about the three axes, i.e. X-axis, Y-axis, and Z-axis is inputted to the microcomputer 54. The microcomputer 54 transmits, as angular velocity data, the data indicative of the angular velocities about the three axes to the controller 5 via the plug 53. The transmission from the microcomputer 54 to the controller 7 is performed at a predetermined time interval. Because game processing is generally performed at a cycle of 1/60 sec. (everyone-frame time), the transmission from the microcomputer 54 to the controller 5 is preferably performed at a cycle shorter than 1/60 sec.

Returning back to the explanation of the controller 5, data outputted from the operation section 32, the imaging information calculation section 35, and the acceleration sensor 37 to the microcomputer 42 and data transmitted from the gyro-sensor unit 7 to the microcomputer 42 are temporarily stored in the memory 43. These data are transmitted as the above operation data to the game apparatus 3. At a timing of transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate a carrier wave of a predetermined frequency with the operation data and to radiate the resultant weak radio signal from the antenna 45. In other words, the operation data is modulated into the weak radio signal by the wireless module 44, and transmitted from the controller 5. The weak radio signal is received by the wireless controller module 19 of the game apparatus 3. The game apparatus 3 can obtain the operation data by demodulating or decoding the received weak radio signal. Then, the CPU 10 of the game apparatus 3 executes the game processing based on the obtained operation data and the game program. Radio transmission from the communication section 36 to the wireless controller module 19 is performed at a predetermined time interval. Because the game processing is generally performed at a cycle of 1/60 sec (every one-frame time), the radio transmission is preferably performed at a cycle shorter than 1/60 sec. The communication section 36 of the controller 5 outputs each operation data to the wireless controller module 19 of the game apparatus 3, for example, every 1/200 sec.

By using the controller 5, the player can perform an operation of inclining the controller 5 at any angle, in addition to a conventional and general game operation such as pressing each operation button. Further, according to the controller 5, the player can also perform an operation of pointing to any position on the screen by using the controller 5, and an operation of moving the controller 5.

[Outline of Game Processing]

Figure 8:
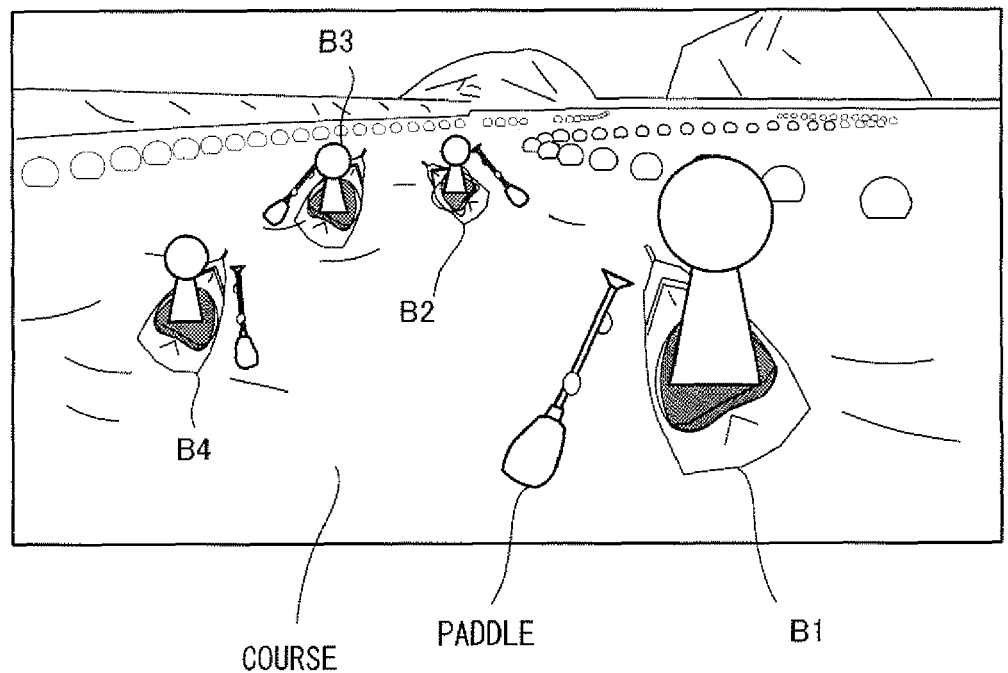
FIG. 8 illustrates an example of a game screen assumed in an embodiment.

With reference to FIGS. 8 to 13, the following will describe an outline of game processing according to the embodiment of the present invention. A game assumed in the present embodiment is a canoe game. FIG. 8 illustrates an example of a game screen assumed in the present embodiment. In FIG. 8, boats (canoes) B (B1 to B4), paddles for rowing the boats, and a course in which the boats B move are shown in the game screen. In the game, the input device 8 is used like the paddle of the canoe (more accurately, the handle of the paddle), and moved so as to row with a paddle (so as to paddle through water), whereby a paddle is also moved (paddling through the water on the course) in the game screen. Thus, the player can move the boat B, and enjoys simulated canoe. In the game, a plurality of players (e.g. four players) move the boats B1 to B4 assigned to the players, by using input devices 8, and the game progresses. In other words, a first player moves the boat B1 by moving an input device 8 held by the first player, a second player moves the boat B2 by moving an input device 8 held by the second player. Similarly, third and fourth players move the boats B3 and B4 by moving input devices 8 held by the third and fourth players, respectively. Then, each player competes with the other players so as to cause the assigned boat B to reach a goal set on the course as soon as possible, and enjoys the game. In FIG. 8, the second player (boat B2) is at the front, and thus the second player is the nearest to the goal (not shown) set on the course ahead and has an advantage over the other players at the moment.

[Outline of Setting of Virtual Camera]

The following will describe setting of a virtual camera in the canoe game in the present embodiment. As shown in FIG. 8, in the present embodiment, a plurality of boats B are simultaneously displayed on one screen. In the present embodiment, by adjusting the imaging direction of the virtual camera and the fixation point of the virtual camera, the plurality of boats B are displayed so as to be easily viewable by each player (such that each boat is easily operated by each player).

First, setting of the imaging direction of the virtual camera will be described. Specifically, in the present embodiment, the imaging direction of the virtual camera is set based a "reference direction" that is individually set for each boat B. In addition, the fixation point of the virtual camera is set based on a "set position" that is individually set for each boat B. The following will describe the "reference direction" and the "set position" of each boat B.

Figure 9:
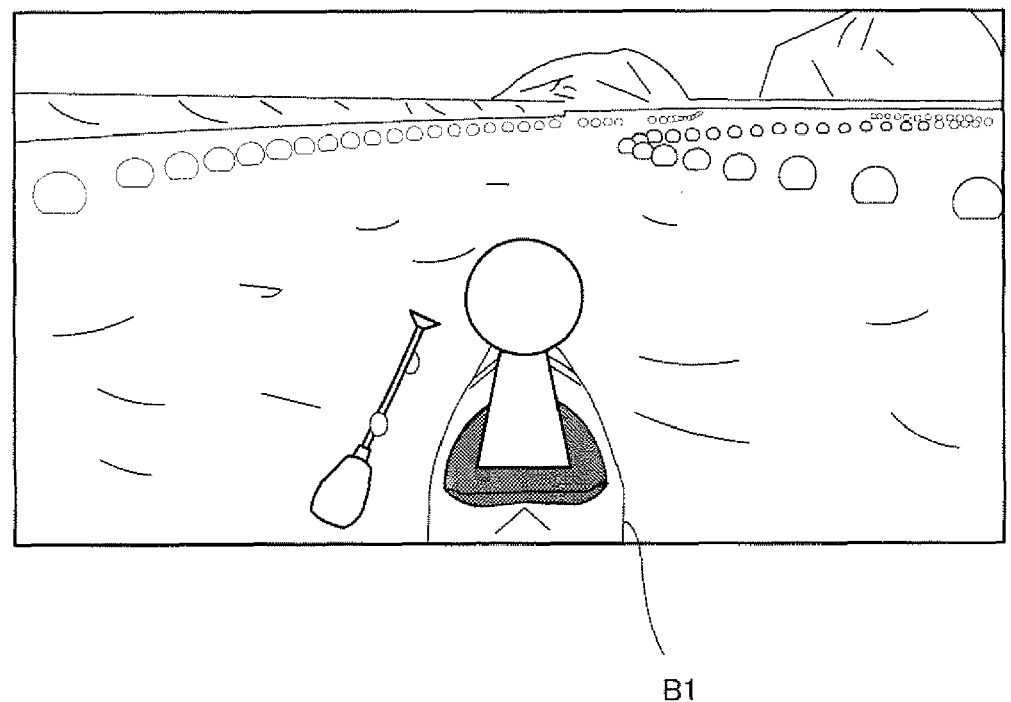
FIG. 9 illustrates an image when a game space is seen from the viewpoint of a boat B1.

The "reference direction" that is set for each boat B is the direction of a view line that is virtually set for each boat B, namely, a direction in which a game space is seen from the viewpoint of each boat B (the viewpoint of a player object aboard each boat B). For example, when the game space is seen from the viewpoint of the boat B1, the view is different from FIG. 8. FIG. 9 illustrates an image when the game space is seen from the viewpoint of the boat B1. In FIG. 9, the boats other than the boat B1 are omitted for easy understanding. As shown in FIG. 9, when the game space is seen from (the player object of) the boat B1, the region on the left side is broader than that of the game space shown in FIG. 8. As described above, the reference direction is different among the boats B.

Figure 10:
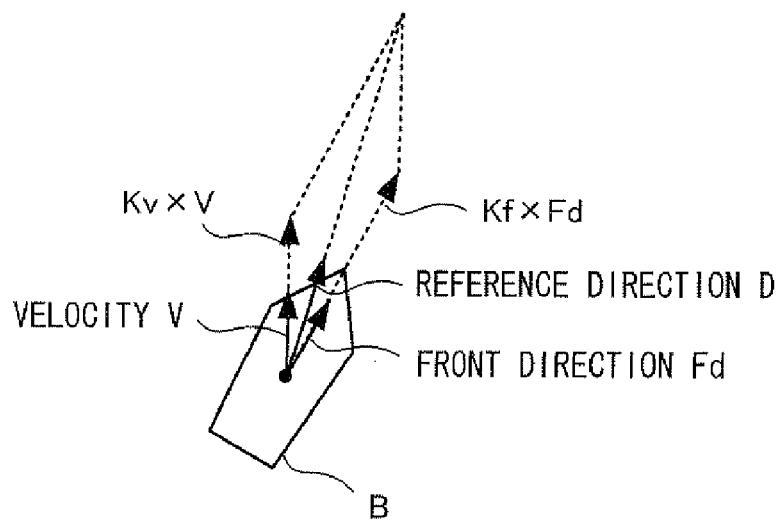
FIG. 10 is a view for explaining a method of calculating a reference direction of a boat B.

Here, the reference direction of the boat B is set based on the moving direction of the boat B and the facing direction (front direction) of the boat B. Specifically, the reference direction is calculated as shown in FIG. 10. FIG. 10 is a view for explaining a method of calculating the reference direction of the boat B, namely, a view when the boat B is seen from above in the game space. In FIG. 10, a velocity vector V indicative of a velocity of the boat B and a front direction vector Fd indicative of the front direction of the boat B are shown. Here, the front direction vector Fd is a unit vector with a direction from the center of the boat B toward the front end of the boat B (the front end of the canoe) in the game space. As shown in FIG. 10, a vector obtained by multiplying the velocity vector V by a weight Kv and a vector obtained by multiplying the front direction vector Ed by a weight Kf are combined and normalized to obtain a reference direction vector D indicative of the reference direction. In other words, a reference direction vector Di of each boat Bi (i is any one of 1 to 4) is calculated by the following formula (1).

$$Di=(Kv*Vi+Kf*Fdi)/|Kv*Vi+Kf*Fdi| \quad (1)$$

The weights Kv and Kf are predetermined coefficients, and, for example, are set to 2 and 3, respectively. Vi denotes a velocity vector of the boat Bi, and Fdi denotes the front direction vector of the boat Bi. The direction of the velocity vector Vi is the current moving direction of the boat Bi.

Next, the imaging direction of the virtual camera is calculated based on the calculated reference direction D (D1 to D4) of each boat B (B1 to B4). Specifically, weighted averaging of each reference direction D (D1 to D4) is performed to calculate an average direction vector WD. The average direction vector WD is calculated by the following formula 2.

$$WD=(W1*D1+W2*D2+W3*D3+W4*D4+Wm*Dm)/(W1+W2+W3+W4+Wm) \quad (2)$$

Each of W1 to W4 is a coefficient that is calculated in accordance with the distance from the front boat to each boat B, namely, a weight for each reference direction vector Di. Wm is a predetermined constant. Dm denotes a vector for causing the average direction vector WD to be directed in a course forward direction (a direction along the course, which is directed from the current position of the boat B toward the goal on the course), and is calculated from a course forward direction of each boat B.

Figure 11:
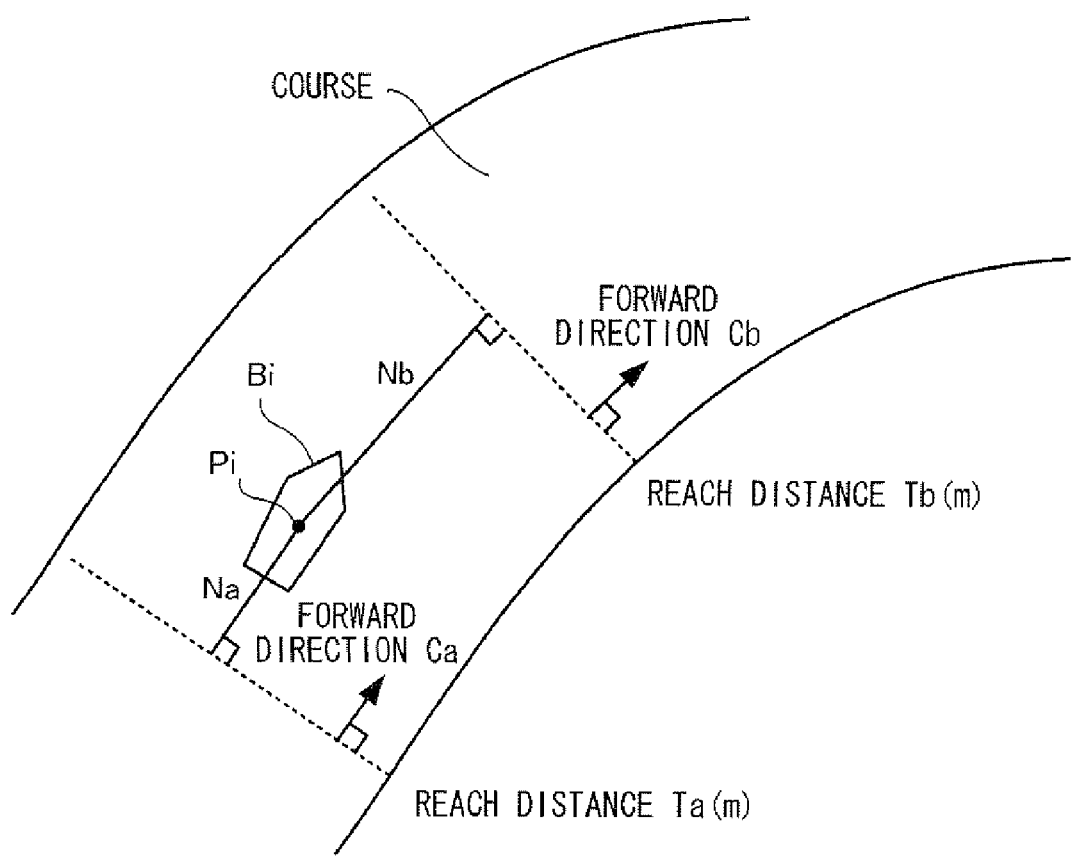
FIG. 11 is a view for explaining a reach distance and a forward direction.

The following will describe a method of calculating the weights W1 to W4, the course forward direction, and Dm. First, a reach distance and the forward direction (course forward direction) for calculating the weights W1 to W4 will be described with reference to FIG. 11. FIG. 11 is a view for explaining the reach distance and the forward direction. FIG. 11 shows a state where, when the course is seen from above in the game space, the boats B are moving on the course toward a goal (not shown) set in the right direction. The reach distance is a distance along the course from a start point (not shown) set in the bottom left direction. The reach distance is determined in accordance with a position in the game space. The forward direction is a direction along the course from a position on the course toward the goal, and, for example, is represented by a unit vector that is defined at a constant interval along the course. Here, where the forward direction vector at a reach distance Ta is denoted by Ca and the forward direction vector at a reach distance Tb (>Ta) is denoted by Cb, a reach distance Ti and a forward direction vector Ci of the boat Bi are calculated by the following formulas 3 and 4.

$$Ti=(Na*Tb+Nb*Ta)/(Na+Nb) \quad (3)$$

$$Ci=(Na*Cb+Nb*Ca)/(Na+Nb) \quad (4)$$

Here, Na denotes the distance from the point of the reach distance Ta to the position Pi of the boat Bi, and Nb denotes the distance from the point of the reach distance Tb to the position Pi of the boat Bi. Based on each forward direction calculated by the formula 4, the above Dm is calculated.

Specifically, Dm denotes a vector indicative of the average of each forward direction vector Ci, and is calculated by the following formula 5.

$$Dm=(C1+C2+C3+C4)/4 \quad (5)$$

The above weight Wi (W1 to W4) is calculated by the following formula 6 using the above-calculated reach distance Ti and the forward direction vector Ci of the boat Bi.

$$Wi=(1+Kt*(T0-Ti))*Si \quad (6)$$

T0 denotes the reach distance of the front boat B. Kt is a predetermined constant. In the formula 6, Si denotes a forward direction degree (a degree of agreement between the direction indicated by the reference direction vector Di and the direction indicated by the forward direction vector Ci). The forward direction degree Si is calculated in accordance with the inner product of the reference direction vector Di and the forward direction vector Ci. Specifically, when the inner product value Di·Ci of the reference direction vector Di and the forward direction vector Ci is 0 or greater, the forward direction degree Si becomes equal to Di·Ci and cos θ (θ is the angle between the vectors Di and Ci). On the other hand, when the inner product value Di·Ci is less than 0, the forward direction degree Si becomes equal to 0. In other words, when the angle between the reference direction vector Di and the forward direction vector Ci is 0, Si becomes equal to 1, and when the angle between the reference direction vector Di and the forward direction vector Ci is 90 degrees or greater, Si becomes equal to 0. It is noted that when the angle between the reference direction vector Di and the forward direction vector Ci is 90 degrees or greater, the forward direction degree Si may be set to a negative value in accordance with the inner product value.

Figure 12:
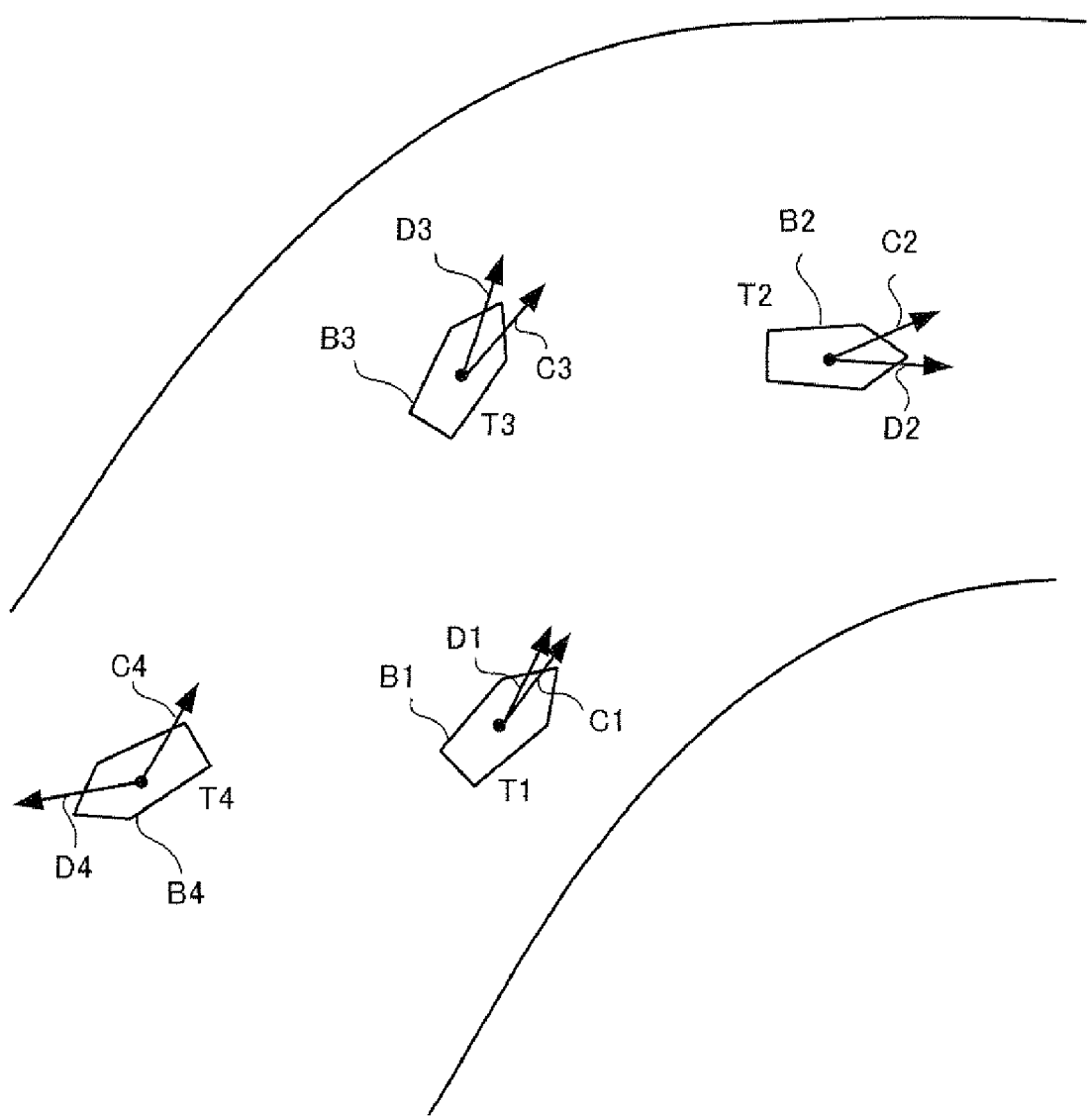
FIG. 12 illustrates an example of a game situation that is seen from above in the game space.

As shown in the above formula 6, the more the boat Bi is distant from the front boat, the greater the weight Wi becomes; and the greater the forward direction degree Si is, the greater the weight Wi becomes. FIG. 12 illustrates an example of a game situation that is seen from above in the game space. For example, when the boat B2 (its reach distance T2), B3 (its reach distance T3), B1 (its reach distance T1), and B4 (its reach distance T4) are moving in this order from the front as shown in FIG. 12, the weights W1 to W4 are as follows.

$$W2=S2=D2·C2$$

$$W3=(1+Kt*(T2-T3))*D3·C3$$

$$W1=(1+Kt*(T2-T1))*D1·C1$$

$$W4=0$$

Because the angle between a reference direction vector D4 and a forward direction vector C4 is 90 degrees or greater, W4 becomes 0.

As described above, each reference direction vector Di is calculated by the formula 1 and each weight Wi is calculated by the formulas 3, 4, and 6. Next, the average direction vector WD is calculated by the formulas 2 and 5. Then, based on the calculated average direction vector WD, the imaging direction of the virtual camera is set. For example, the imaging direction of the virtual camera is set by adding, to the average direction vector WD, a vector having a downward direction in the game space and a predetermined magnitude (a vector in the z-axis negative direction). Because the average direction vector WD calculated as described above has a horizontal direction (a direction parallel to the water surface on the course) in the game space, when the imaging direction of the virtual camera is caused to agree with the average direction vector, an image being displayed becomes an image in which it is difficult to understand a distance in the depth direction. Thus, by adding, to the average direction vector WD, a vector having a downward direction in the game space, an image in which the game space is seen obliquely from above is displayed, and thus an easily viewable image is displayed as shown in FIG. 8.

As described above, by setting the imaging direction of the virtual camera based on the average direction vector WD, an image being displayed becomes an image that is easily viewable by a plurality of players and in which each boat is easily operated by each player. Further, the more a boat is distant from the front boat, the greater the weight for the reference direction of the boat becomes. Thus, the imaging direction of the virtual camera becomes close to the reference direction of a boat that is distant from the front boat. As a result, an image being displayed becomes an image that is taken in a direction close to the reference direction of the boat that is distant from the front boat, and hence becomes easily viewable by a player whose boat is far behind the front boat. For that reason, the player whose boat is far behind the front boat has an advantage, and each player can enjoy the game even when there is the difference among the operation skills of players.

Further, the greater the forward direction degree of the reference direction of each boat is, the greater the weight for the reference direction becomes. Thus, the imaging direction of the virtual camera becomes close to the reference direction of a boat having a great forward direction degree. Therefore, an image being displayed becomes easily viewable by a player who operates a boat whose reference direction and forward direction agree with each other. In other words, an image being displayed becomes easily viewable by a player who operates a boat accurately along the course forward direction. On the other hand, because the weight for the reference direction of a boat whose facing direction is opposite to the course forward direction thereof and the weight for the reference direction of a boat that is moving in a direction opposite to the course forward direction thereof are set to 0, the reference directions of these boats do not influence the imaging direction of the virtual camera. Thus, even when some boats are moving in a direction across the course or in the reverse direction on the course, the imaging direction of the virtual camera is not substantially deviated from the course forward direction. For that reason, for example, even when three players are moving their boats along the course forward direction and one player is intentionally moving its boat in the reverse direction on the course, an image that is desirable for the three players (an image taken in the course forward direction) is displayed.

The following will describe setting of the fixation point of the virtual camera. In the present embodiment, as described above, the fixation point of the virtual camera is set based on the "set position" that is individually set for each boat B. The "set position" that is individually set for each boat B is a position that is defined based on the position and the aforementioned reference direction of the boat. Specifically, a set position Ai of the boat Bi is calculated by the following formula 7.

$$Ai = Pi + Kd * Di \qquad (7)$$

Pi denotes a position vector of the boat Bi, and Kd is a predetermined constant. The set position calculated thus is a position that is set based on the moving direction and the facing direction (front direction) of the boat, namely, a position to which the boat is expected to move based on the current moving direction and the facing direction (front direction) of the boat. It is noted that the reason why not only the moving direction of the boat but also the facing direction (front direction) of the boat are taken into consideration when the set position of the boat is calculated, is that the boat is basically accelerated in its front direction in accordance with an operation of the player and thus a position to which the boat is to move can be also influenced by the facing direction (front direction) of the boat. In order for a player operating a boat to progress the game with advantage, it is important for the player to know the situation of a position to which the boat operated by the player is to move. Thus, the set position of the boat can be said to be a position that the player operating the boat desires to visually confirm most on the screen.

By performing weighted averaging of the set position Ai of each boat calculated by the above formula 7, a fixation point A of the virtual camera is calculated. The fixation point A of the virtual camera is calculated by the following formula 8.

$$A = (WA1*A1 + WA2*A2 + WA3*A3 + WA4*A4)/(WA1 + WA2 + WA3 + WA4) \qquad (8)$$

Each of WA1 to WA4 is a coefficient that is calculated in accordance with the distance from the front boat to each boat B, namely, a weight for each set position Ai.

A weight WAi for each set position Ai is calculated by the following formula 9.

$$WAi = 1 + Kt*(T0 - Ti) \qquad (9)$$

Kt is a predetermined constant. T0 denotes the reach distance of the front boat B.

Figure 13:
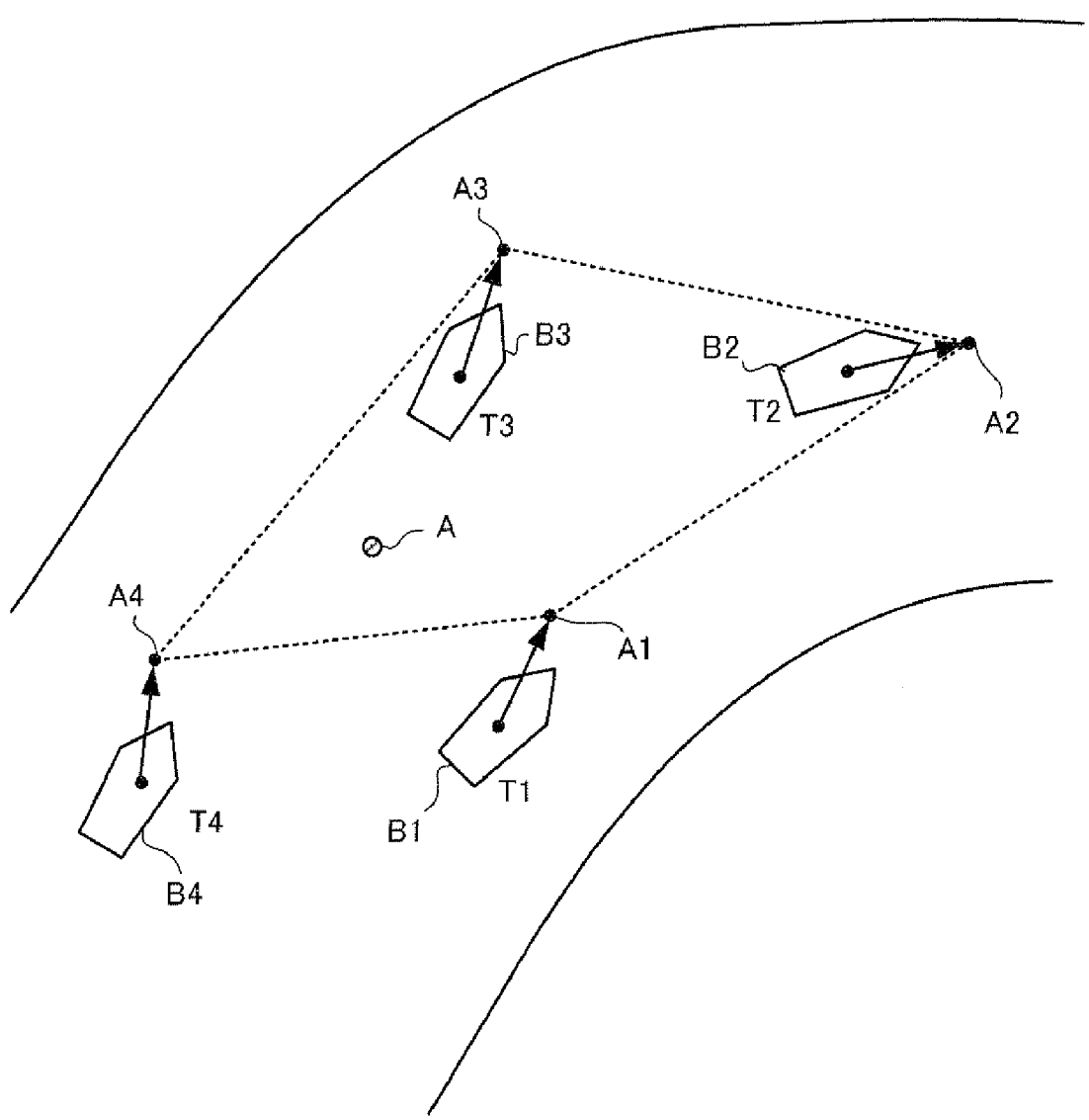
FIG. 13 is a view showing the fixation point of a virtual camera in an example of a game situation.

As shown in the above formula 9, similarly to the weight Wi calculated by the above formula 6, the more the boat Bi is distant from the front boat, the greater the weight WAi becomes. FIG. 13 is a view showing the fixation point of the virtual camera in an example of a game situation. For example, as shown in FIG. 13, when the boat B2 (its reach distance T2), B3 (its reach distance T3), B1 (its reach distance T1), and B4 (its reach distance T4) are moving in this order from the front as shown in FIG. 12, the weights WA1 to WA4 are as follows.

$$WA2 = 1$$

$$WA3 = 1 + Kt*(T2 - T3)$$

$$WA1 = 1 + Kt*(T2 - T1)$$

$$WA4 = 1 + Kt*(T2 - T4)$$

Then, by assigning these weights WA1 to WA4 to the above formula 8, the fixation point A of the virtual camera is calculated. As shown in FIG. 13, because the weight for the boat B4 that is most distant from the front boat B2 is the greatest, the fixation point A of the virtual camera gets close to the set position A4 of the boat B4 that is at the bottom (more accurately, gets closer to the set position A4 of the boat B4 than to the center of gravity of the set positions A1 to A4 of the boats B1 to B4). In FIG. 13, the boat B1 is closest to the fixation point A. As described above, because the fixation point A is calculated by performing weighted averaging of the set position of each boat, the fixation point A is not necessarily closest to the position of the boat that is at the bottom.

As described above, the fixation point of the virtual camera is set so as to be closer to the set position of a boat that is far behind the front boat. Because the fixation point of the virtual camera is set at the center of the screen, an image being displayed becomes an image that is easily viewable by a player whose boat is far behind the front boat (in which it is easy for the player to perform an operation). In particular, an image that is more easily viewable by a player whose boat is far behind the front boat.

By setting the imaging direction of the virtual camera and the fixation point of the virtual camera as described above, an image being displayed becomes an image that is easily viewable by a plurality of players and in which each boat is easily operated.

Although described in detail later, in the present embodiment, a fixation point distance (distance from the virtual camera to its fixation point) of the virtual camera is set such that the above plurality of boats B (B1 to B4) are displayed on one screen. However, in the case where the distances among the boats are long, when all the boats are displayed on one screen by setting the fixation point distance of the virtual camera to be long, each boat is displayed in a small size. Thus, a maximum value is provided for the fixation point distance of the virtual camera, and the fixation point distance is set so as not to exceed the maximum value. When the fixation point distance reaches the maximum value, some boats may not be displayed on the screen.

[Detail of Game Processing]

Figure 14:
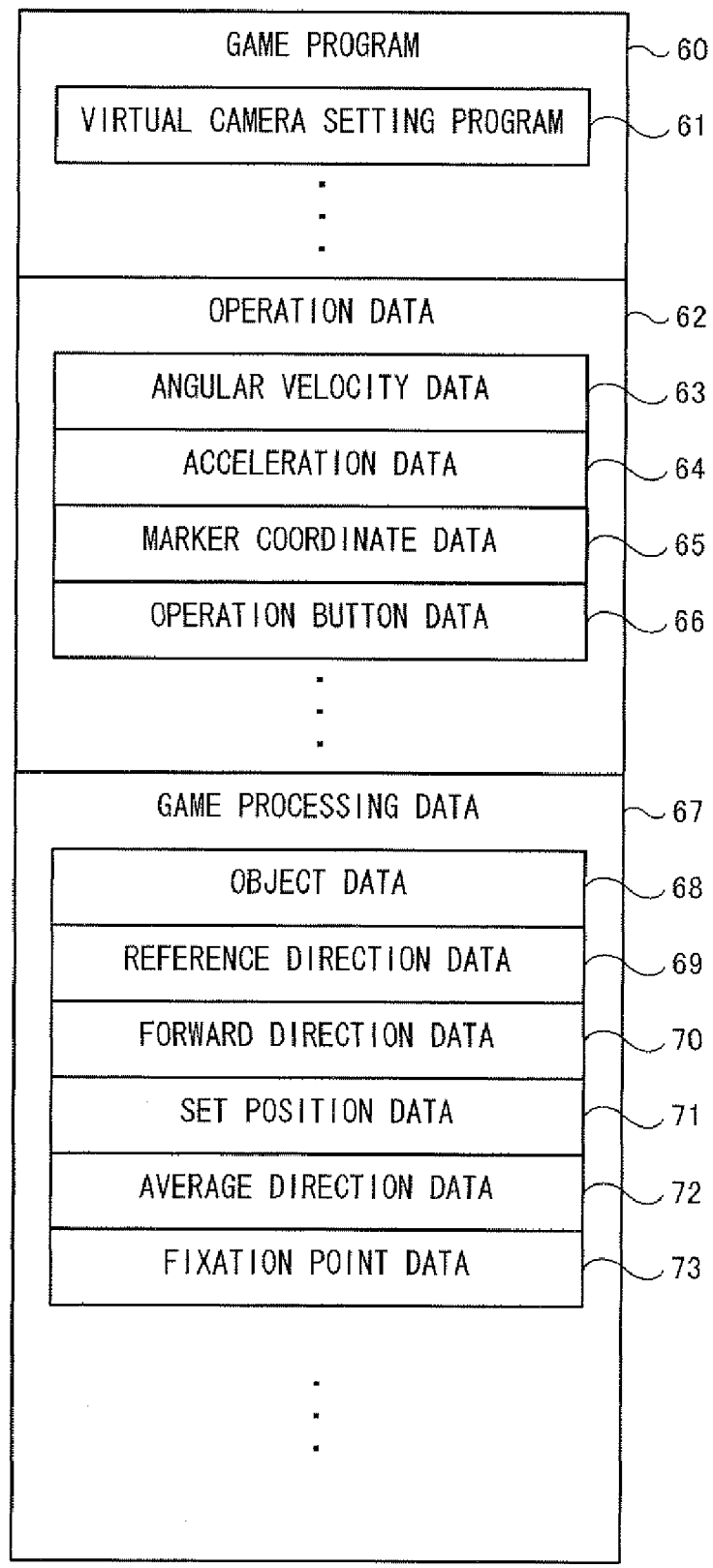
FIG. 14 shows main data stored in a main memory (an external main memory 12 or an internal main memory 11e) of the game apparatus 3.

With reference to FIGS. 14 to 18, the following will describe in detail game processing executed by the game apparatus 3. First, main data used in processing executed by the game apparatus 3 will be described with reference to FIG. 14. FIG. 14 shows main data stored in a main memory (the external main memory 12 or the internal main memory 11e) of the game apparatus 3.

Referring to FIG. 14, a game program 60, operation data 62, and game processing data 67 are stored in the main memory of the game apparatus 3. In addition to the data shown in FIG. 14, data required for the game processing, such as image data of various objects appearing in the game and data indicative of various parameters of the objects, is stored in the main memory.

At an appropriate timing after power is applied to the game apparatus 3, the game program 60 is partially or entirely read from the optical disc 4 and stored in the main memory. The game program 60 includes a virtual camera setting program 61. The virtual camera setting program 61 is a program for controlling the virtual camera, such as the imaging direction and the fixation point of the virtual camera and the like.

The operation data 62 is operation data transmitted from a plurality of controllers 5 (input devices 8) to the game apparatus 3. In other words, the operation data 62 includes operation data of a controller 5 held by the first player, operation data of a controller 5 held by the second player, operation data of a controller 5 held by the third player, and operation data of a controller 5 held by the fourth player. Because operation data is transmitted from the controller 5 to the game apparatus 3 every 1/200 sec. as described above, the operation data 62 stored in the external main memory 12 is updated at this cycle.

The operation data 62 includes angular velocity data 63, acceleration data 64, marker coordinate data 65, and operation button data 66. The angular velocity data 63 is data indicative of angular velocities detected by the gyro-sensors 55 and 56 of the gyro-sensor unit 7. Here, the angular velocity data 63 is indicative of angular velocities about the three axes, namely, about X-axis, Y-axis, and Z-axis shown in FIG. 3. The acceleration data 64 is data indicative of acceleration (an acceleration vector) detected by the acceleration sensor 37. Here, the acceleration data 64 is indicative of a three-dimensional acceleration vector including, as components, acceleration in the three axial directions, namely, in the directions of X-axis, Y-axis, and Z-axis shown in FIG. 3.

The marker coordinate data 65 is data indicative of a coordinate calculated by the image processing circuit 41 of the imaging information calculation section 35, namely, the above marker coordinate.

The operation button data 66 is data indicative of an input state of each of the operation buttons 32a to 32i.

The game processing data 67 is data used in the later-described game processing (a flow chart shown in FIG. 15). The game processing data 67 includes object data 68, reference direction data 69, forward direction data 70, set position data 71, average direction data 72, and fixation point data 73. In addition to the data shown in FIG. 14, the game processing data 67 includes various data (data indicative of game parameters, etc.) used in the game processing.

The object data 68 is a set of data indicative of the position Pi, the velocity Vi, the reach distance Ti, and the front direction vector Fdi of the boat Bi (i=1 to 4). In the main memory, data indicative of the above information is stored for each boat.

The reference direction data 69 is data indicative of the reference direction vector Di of each boat Bi. The forward direction data 70 is data indicative of the forward direction vector Ci of the boat Bi. The set position data 71 is data indicative of the set position Ai of each boat Bi. The average direction data 72 is data indicative of the aforementioned average direction vector WD. The fixation point data 73 is data indicative of the aforementioned fixation point A.

Figure 15:
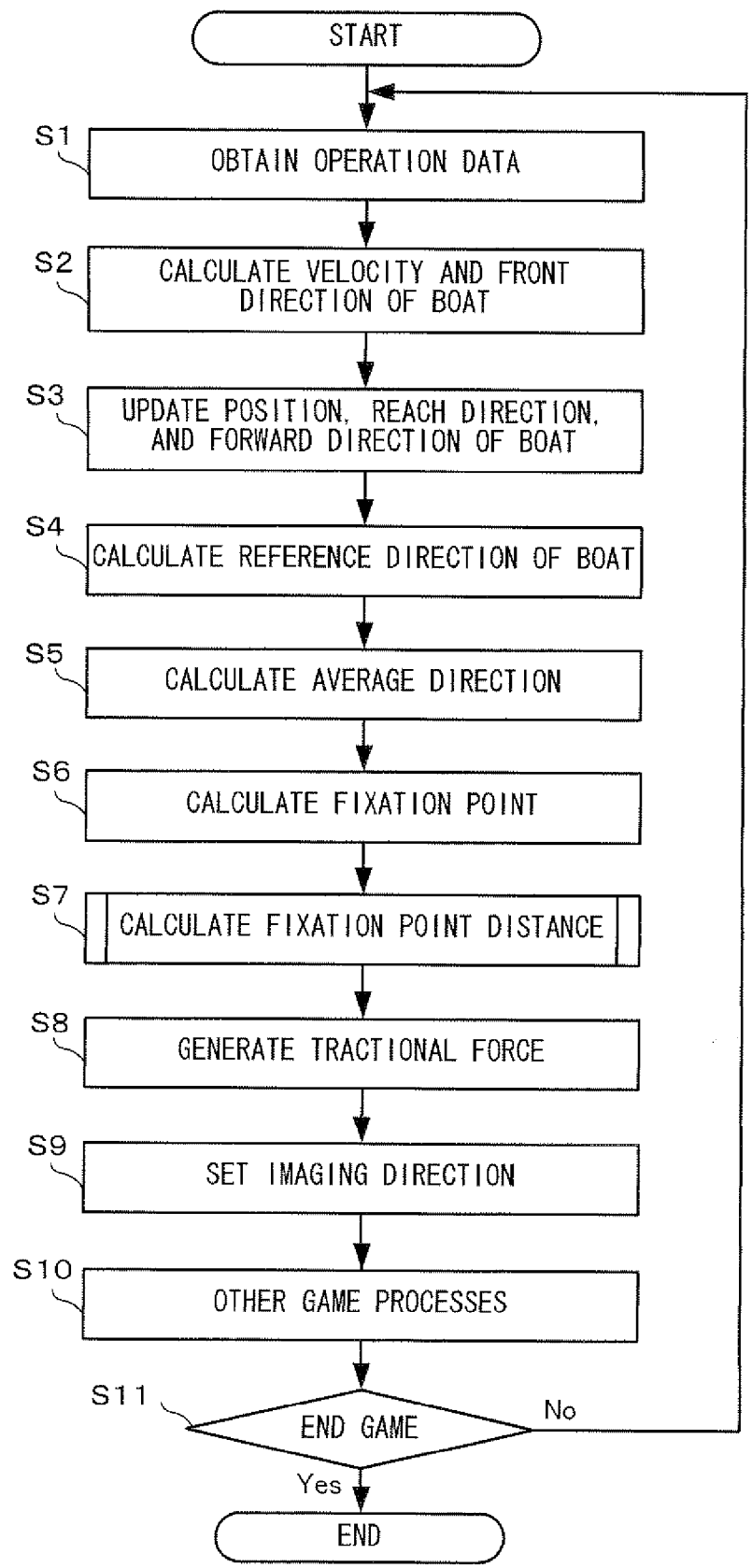
FIG. 15 is a main flow chart showing a procedure of game processing executed by the game apparatus 3.

With reference to FIG. 15, the following will describe the game processing executed by the game apparatus 3. FIG. 15 is a main flow chart showing a procedure of the game processing executed by the game apparatus 3. When power is supplied to the game apparatus 3, the CPU 10 of the game apparatus 3 executes the boot program stored in the ROM/RTC 13 to initialize each unit such as the external main memory 12 and the like. Then, the game program stored in the optical disc 4 is read by the main memory, and the CPU 10 starts to execute the game program. The flow chart shown in FIG. 15 shows the game processing that is executed after the completion of the above processing. In FIG. 15, processes that are not directly relevant to the present invention will not be described, and a process regarding the aforementioned setting, of the virtual camera will be mainly described. The loop of processes at steps S1 to S10 shown in FIG. 15 is repeatedly performed every one-frame.

First, at step S1, the CPU 10 obtains operation data. Specifically, the CPU 10 refers to the operation data 62 in the main memory, and obtains operation data of the input device 8 associated with each boat B positioned in the game space. Next, the CPU 10 executes the process at step S2.

At step S2, the CPU 10 calculates the velocity and the front direction of each boat B in the game space. In the process at step S2, the CPU 10 calculates a new velocity Vi of the boat Bi based on the current velocity Vi of the boat Bi, the operation data of the boat Bi obtained at step S1, and the like (i.e., updates the velocity Vi of the boat Bi). Further, the CPU 10 calculates a front direction of the boat Bi based on the current front direction of the boat Bi and the operation data of the boat Bi. Specifically, based on the operation data of the boat Bi obtained at step S1, the CPU 10 calculates a force to be applied to the boat Bi (a magnitude and a direction of the force). Then, the CPU 10 applies the calculated force to the boat Bi, and calculates a velocity Vi of the boat Bi by taking into consideration the direction of wind (a resistance force to the wind) in the game space, the flow of the river (resistance to water) on which the boat floats, and the like. The force to be applied to the boat Bi is calculated based on the angular velocity data 63 and the acceleration data 64 included in the operation data of the boat Bi. Further, the CPU 10 calculates a new front direction vector Fdi by adding, to the current front direction vector Fdi, rotation in accordance with the force (its magnitude and its direction) to be applied to the boat Bi. For example, by inferring the orientation and the moving velocity of the input device 8 based on the angular velocity and the acceleration of the input device 8 associated with the boat Bi, a force to be applied to the boat B1 is calculated. Then, the CPU 10 calculates a new velocity V1 of the boat B1 based on the calculated force, the resistance force to the water, the resistance force to the wind, and the current velocity V1 of the boat B1. Further, the CPU 10 calculates a front direction vector Fd1 of the boat B1 by adding, to the boat B1, rotation in accordance with the calculated force. Then, the CPU 10 stores, as the object data 68, the velocity V1 and the front direction vector Fd1 of the boat B1 in the main memory. After calculating the velocity and the front direction of each boat B and storing them in the main memory, the CPU 10 executes the process at step S3 next.

At step S3, the CPU 10 updates the position, the reach distance, and the forward direction of each boat B in the game space. Specifically, the CPU 10 updates the position Pi of the boat Bi based on the current position Pi and the velocity Vi of the boat Bi. Further, the CPU 10 calculates a reach distance Ti and a forward direction vector Ci in accordance with the updated position Pi. Then, the CPU 10 stores, as the object data 68, the position, the reach distance, and the forward direction of each boat B in the main memory. Next, the CPU 10 executes the process at step S4.

At step S4, the CPU 10 calculates a reference direction of each boat B. Specifically, the CPU 10 refers to the main memory to obtain the velocity Vi and the front direction vector Fdi of the boat Bi, and calculates the reference direction Di of the boat Bi by multiplying these vectors by predetermined coefficients and combining the resultant vectors (see the above formula 1). Then, the CPU 10 stores, as the reference direction data 69, each calculated reference direction D in the main memory. Next, the CPU 10 executes the process at step S5.

At step S5, the CPU 10 calculates an average direction by performing weighted averaging of the reference direction of each boat B. Specifically, the CPU 10 refers to the main memory, and obtains the reach distance Ti, the reference direction vector Di, and the forward direction vector Ci of the boat Bi. Next, the CPU 10 calculates the inner product of the reference direction vector Di and the forward direction vector Ci to calculate the above forward direction degree Si. Then, after calculating a weight Wi using the above formula 6, the CPU 10 calculates an average direction vector WD using the formula 2, and stores the average direction vector WD in the main memory. Subsequent to step S5, the CPU 10 executes the process at step S6.

At step S6', the CPU 10 calculates the fixation point of the virtual camera. Specifically, the CPU 10 calculates the set position Ai of the boat Bi using the above formula 7. Next, the CPU 10 calculates the weight WAi for each set position, using the formula 9. Then, the CPU 10 calculates the fixation point A of the virtual camera by performing weighted averaging of each calculated set position (see the above formula 8). Next, the CPU 10 executes the process at step S7.

Figure 16:
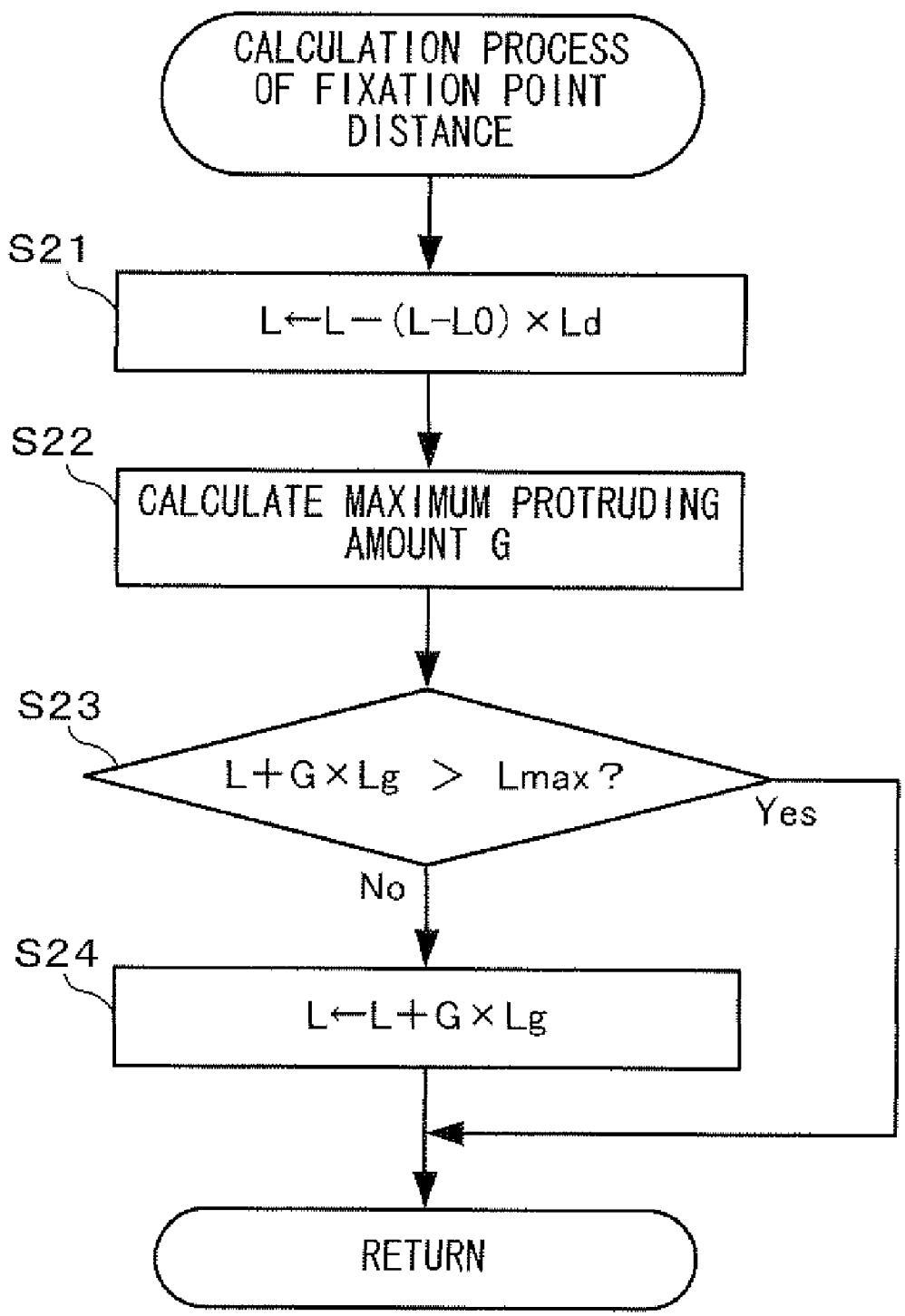
FIG. 16 is a flow chart showing in detail a calculation process (step S7) of a fixation point distance in FIG. 15.

At step S7, the CPU 10 calculates the fixation point distance of the virtual camera. The process at step S7 is a process of setting the imaging range of the virtual camera. Here, the fixation point distance is the distance from the position (viewpoint) to the fixation point A of the virtual camera. The longer the fixation point distance is, the broader the imaging range becomes. The process at step S7 will be described in detail with reference to FIG. 16. FIG. 16 is a flow chart showing in detail the calculation process (step S7) of the fixation point distance in FIG. 15.

First, the CPU 10 executes a process at step S21. At step S21, the CPU 10 updates the current fixation point distance L. Specifically, the CPU 10 sets a fixation point distance L using the following formula 10.

$$\text{New } L = \text{Current } L - (\text{Current } L - L0) * Ld \qquad (10)$$

L0 denotes an initial distance for the fixation point distance, and is set, for example, to 2.5 (m). Ld is a predetermined constant. As shown in the formula 10, the fixation point distance L is set so as to gradually get close to the initial distance L0. This prevents the fixation point distance L from rapidly changing, and thus the imaging range of the virtual camera is prevented from being rapidly enlarged or reduced. Subsequent to the process at step S21, the CPU 10 executes a process at step S22.

Figure 17:
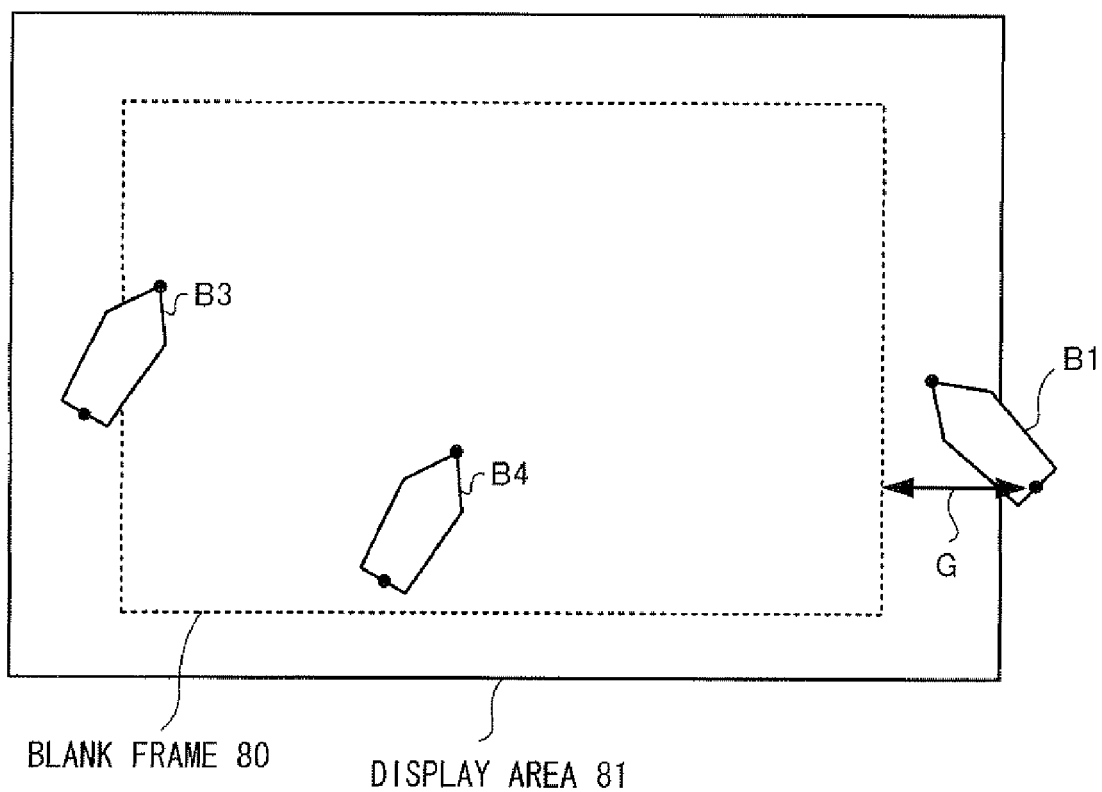
FIG. 17 is a view for explaining a maximum protruding amount.

At step S22, the CPU 10 calculates a maximum protruding amount G. Here, the maximum protruding amount is a maximum value of an amount of each boat B protruding from the display area (imaging range). FIG. 17 is a view for explaining a maximum protruding amount. In FIG. 17, a display area 81 is defined by the outer frame of the screen (television screen) and, the range of the game space displayed on the display area 81 agrees with the imaging range of the virtual camera that is set based on the fixation point distance L. As shown in FIG. 17, with the fixation point distance L that is set at step S21, the boats B3 and B4 are displayed entirely, but a part of the boat B1 protrudes from the display area 81 because the imaging range of the virtual camera is narrow. In order to display the entire boat B1 within the display area 81, the maximum protruding amount G is calculated. Specifically, the CPU 10 calculates the front end and rear end positions (coordinate positions on the screen) of each boat B, and calculates distances from a blank frame 80 that is set on the screen. Then, the CPU 10 calculates a maximum protruding amount G that is the maximum distance from the blank frame 80. When all the boats B do not protrude from the display area 81, the maximum protruding amount G becomes 0. Next, the CPU 10 executes a process at step S23.

At step S23, the CPU 10 determines whether or not "L+G*Lg" is greater than the maximum value Lmax of the fixation point distance. Here, G denotes the maximum protruding amount G calculated at step S22, and Lg is a predetermined constant. The process at step S23 is a process for preventing the fixation point distance L from exceeding the maximum value Lmax. The longer the fixation point distance L is, the broader the imaging range of the virtual camera becomes. However, when the imaging range is broader, each boat is displayed in a smaller size and thus it is difficult for the player to view each boat. Thus, the maximum value is set for the fixation point distance. When the determination result is negative, the CPU 10 executes a process at step S24 next. On the other hand, when the determination result is positive, the CPU 10 ends the calculation process of the fixation point distance shown in FIG. 16.

At step S24, the CPU 10 updates the fixation point distance L. Specifically, the CPU 10 calculates a new fixation point distance L by adding "G*Lg" to the fixation point distance L calculated at step S21, and stores the new fixation point distance L in the main memory. By setting the fixation point distance L at step S24, when there is a boat protruding from the display area 81, the imaging range (display area) of the virtual camera is enlarged (i.e. the entire screen is zoomed out) so as to include the protruding boat within the display area. Further, by adding "G*Lg", the imaging range is gradually enlarged. Thus, the display area is prevented from being rapidly enlarged. Subsequent to step S24, the CPU 10 ends the calculation process of the fixation point distance shown in FIG. 16.

The fixation point distance L is adjusted so as not to exceed the maximum value Lmax at step S23. However, in the case where there is a boat that is not displayed in the display area 81 at all when the fixation point distance L becomes the maximum value Lmax, the rough position and orientation of the boat that is not displayed may be shown by displaying a balloon at the edge of the screen.

Figure 18:
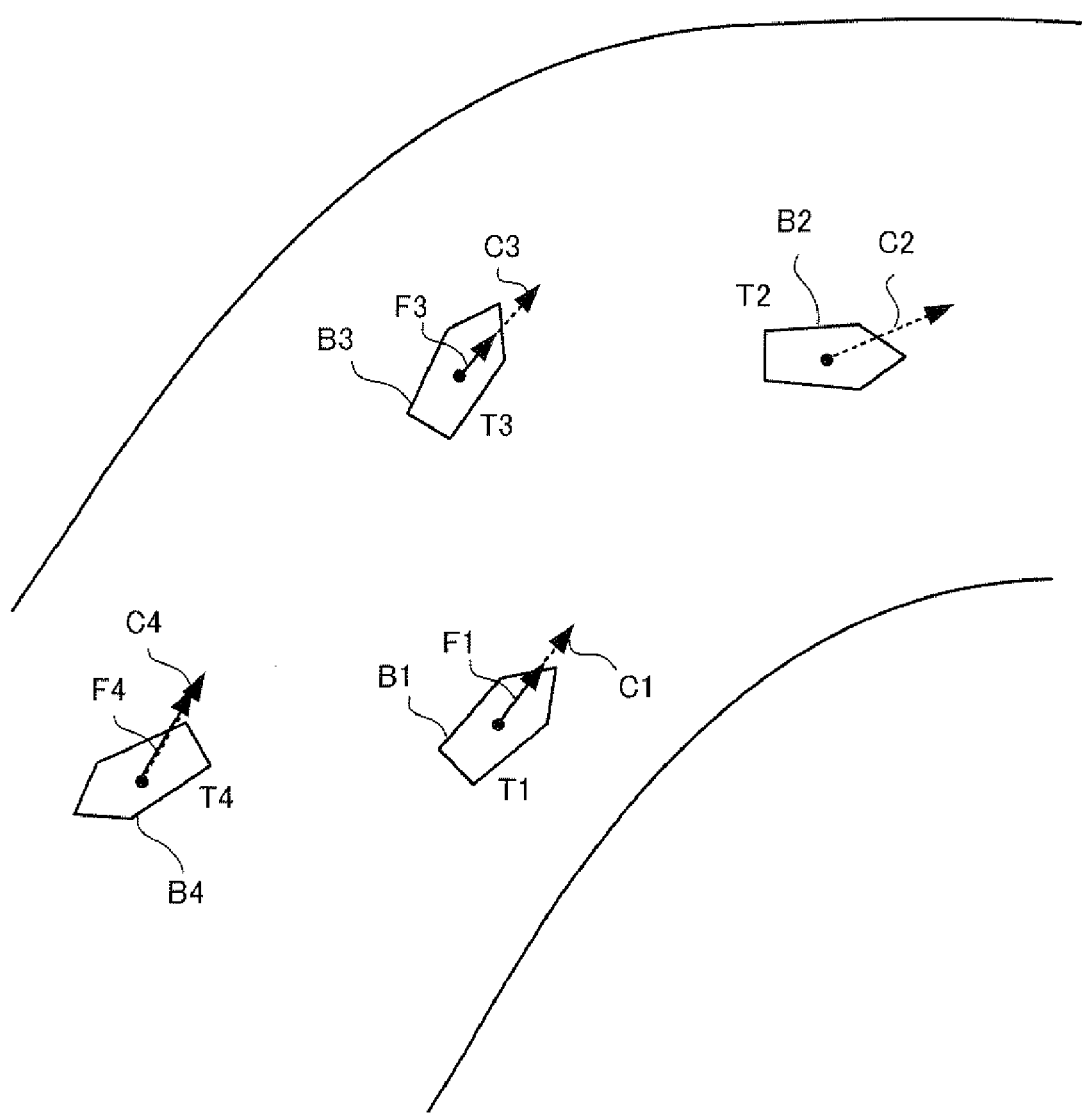
FIG. 18 is a view for explaining tractional forces with respect to boats other than a front boat.

Referring back to FIG. 15, the CPU 10 executes the process at step S8 next. At step S8, the CPU 10 generates tractional forces with respect to the boats other than the front boat. This process is a process of correcting movement of the boats other than the front boat, by applying forces in the course forward direction to the front ends of the boats other than the front boat. In other words, at step S8, the moving directions of the boats other than the front boat are corrected by causing the facing directions (front direction) of the boats to get close to the course forward direction while accelerating the boats other than the front boat in the course forward direction. By this process, the boats other than the front boat can be prevented from being excessively far behind the front boat in the race. FIG. 18 is a view for explaining tractional forces with respect to the boats other than the front boat. For example, as shown in FIG. 18, the CPU 10 applies, to the front end of each boat B (B1, B3, and B4), a tractional force Fi (F1, F3, and F4) in the forward direction of each boat B, which has a magnitude in accordance with the distance to the front boat B2. Specifically, the CPU 10 calculates the tractional force Fi with respect to the boat Bi by the following formula 11.

$$Fi = fi * Ci \quad (11)$$

Here, fi is a value (in the range from 0.0 to 1.0) that changes in accordance with the distance to the front boat. Specifically, fi is set based on a value obtained by subtracting the reach distance Ti of the boat Bi from the reach distance T0 of the front boat. For example, when "T0−Ti" is less than a predetermined lower limit (e.g. 5 m), fi is set to 0. When "T0−Ti" is greater than a predetermined upper limit (e.g. 15 m), fi is set to 1. When "T0−Ti" is a value between the lower and upper limits, fi is set so as to be proportional to the value (T0−Ti). Then, the CPU 10 updates the velocity, the position, and the facing direction (front direction) of each boat B by applying, to the front end of each boat B, the tractional force calculated at step S8. Subsequent to the process at step S8, the CPU 10 executes the process at step S9 next.

At step S9, the CPU 10 sets the imaging direction of the virtual camera. Specifically, the CPU 10 sets the imaging direction of the virtual camera based on the average direction calculated at step S5. For example, the CPU 10 calculates the imaging direction of the virtual camera by adding a predetermined downward vector (a vector having a downward direction (the z-axis negative direction) in the game space) to the average direction vector WD calculated at step S5. The downward vector is set in accordance with the aforementioned fixation point distance L. For example, the longer the fixation point distance L is (the broader the imaging range of the virtual camera is), the greater the downward vector is set to be. Thus, when the imaging range (display area) of the virtual camera is broader, an image is displayed in which the course is seen down from a higher position. As described above, by lowering the imaging direction of the virtual camera when the fixation point distance is longer, an image that is easily viewable by the player is displayed. In other words, when the imaging range is broad, the boat that is the farthest (e.g. the front boat B2 shown in FIG. 8), among boats included in the imaging range, is displayed in a small size, and the surroundings around the boat B2 are also displayed in a small size. In this case, when the imaging direction of the virtual camera is close to the horizontal direction (when the added downward vector is small), it is difficult for the player operating the boat B2 to understand the positional relation between the position of the boat B2 and the course around the boat B2, an obstacle, and the like. On the other hand, when the game space is seen from a high position, it is easy for the player to understand the positional relation even when the boat and the surroundings around the boat are displayed in a small size. Subsequent to the process at step S9, the CPU 10 executes the process at step S10 next.

At step S10, the CPU 10 executes other game processes. For example, the CPU 10 executes a process of: determining whether or not the boat collides with an obstacle; and the like, and in accordance with the determination result, the CPU 10 executes a predetermined process (e.g. when the boat collides with an obstacle, the CPU 10 decreases the velocity of the boat and/or changes the moving direction and the facing direction of the boat). Further, the CPU 10 determines whether or not the boat reaches the goal, and in accordance with the determination result, the CPU 10 executes a predetermined process. Still further, the CPU 10 executes a display process. Whereby, boats, paddles, obstacles, surrounding objects around the course, and the like, which are present in the display area (imaging range) that is set based on the imaging direction, the fixation point, and the fixation point distance of the virtual camera that are calculated as described above, are displayed on the television 2.

Next, at step S1, the CPU 10 determines whether or not to end the game. When the determination result is positive, the CPU 10 ends the game processing, and when the determination result is negative, the CPU 10 returns to step S1 to repeat the game processing. This is the end of the description of the game processing according to the present embodiment.

As described above, in the present embodiment, the average direction is calculated by performing weighted averaging of the reference direction of each boat, and the imaging direction of the virtual camera is set. Further, the fixation point of the virtual camera is set by performing weighted averaging of the set position of each boat (a position that is set based on the position and the reference direction of the boat). An image taken by the virtual camera set as described above becomes an image that is easily viewable by each player and in which it is easy for each player to perform an operation.

In the present embodiment, the reference direction of each boat is calculated by the velocity and the front direction of each boat, and the above average direction is calculated by performing weighted averaging of the calculated reference directions. In an alternative embodiment, the reference direction of each boat may be set in accordance with the velocity (moving direction) or the front direction of each boat, and the above average direction may be calculated by using these reference directions. For example, the above average direction may be calculated by performing weighted averaging of the moving direction of each boat.

In the present embodiment, the reference direction of each boat is calculated by the above formula 1 using the velocity and the front direction vector of the boat. In an alternative embodiment, the specific calculation method is not limited thereto, and the reference direction of each boat may be calculated based on the moving direction and the facing direction of the boat by any calculation method. For example, the reference direction of each boat may be calculated by simply adding the velocity and the front direction vector of the boat, or may be calculated by adding a predetermined direction (vector) to the velocity and the front direction vector of the boat. Further, the reference direction of each boat may be calculated by using the velocity and a rearward vector (a vector having a direction opposite to the direction of the front direction vector) of the boat, or may be calculated by using the velocity and a rightward vector (a vector that is orthogonal to the front direction vector and has a direction when the boat is seen from left) of the boat. The reference direction of each boat calculated thus may be a direction when each boat is seen from front, or a direction when each boat is seen from left. In other words, in the present embodiment, the reference direction of each boat is a direction in which the game space is seen from the viewpoint of each boat. However, in an alternative embodiment, the reference direction of each boat is a direction that is set based on the facing direction and the moving direction of each boat, and is not limited to the direction in which the game space is seen from the viewpoint of each boat.

In the present embodiment, the weight is increased for a boat (a disadvantageous boat) that is more distant from the front boat, and the above average direction is calculated. However, in an alternative embodiment, the weight may be increased for a boat (an advantageous boat) that is closer to the front boat, and the above average direction may be calculated. Thus, the imaging direction of the virtual camera becomes close to the reference direction of the front boat, and the front boat has an advantage.

In a game according to an alternative embodiment, the weight may be increased for an object that is in an advantageous (or disadvantageous) situation for the rules of the game, and the above average direction may be calculated. For example, in a game in which a plurality of objects compete with each other on wining points (number of wins), wining percentage, or score, an object with greater (or lower) wining points, a higher (or lower) wining percentage, or a greater (or lower) score is considered to be in an advantageous (or disadvantageous) situation, and the weight may be increased for the object.

In the present embodiment, the set position of each boat is calculated based on the position and the reference direction of the boat (the formula 7). In an alternative embodiment, the set position of each boat may be calculated only based on the position of the boat.

The weights for the reference direction Di and the set position Ai of each boat may be calculated by a method other than the aforementioned method (the formula 6 or the formula 9). For example, the weight for each boat (the reference direction Di and the set position Ai of each boat) may be set in advance. For example, in accordance with the skill levels of a plurality of players, weights may be set by the players prior to start of the game. In this case, a weight is set to be relatively great for a player with a low skill level, and a weight is set to be relatively low (or 0) for a player with a high skill level. By making in advance camera settings by the players, the camera settings (imaging direction and fixation point) can be provided which are relatively advantageous for a player with a low skill level. Thus, an image that is easily viewable by a player with a low skill level and in which it is easy for the player to perform an operation is displayed, and hence this is a handicap for a player with a high skill level. As described above, by setting in advance an advantageous or disadvantageous condition for each player, a handicap can be set in accordance with the skill level of each player.

As described above, in an alternative embodiment, the reference direction of each object may be calculated based on the moving direction and/or the facing direction of the object. Then, the above average direction may be calculated by performing weighted averaging of each calculated reference direction under a predetermined condition. Here, the predetermined condition is a condition of increasing a weight for a more advantageous (or more disadvantageous) situation or of increasing a weight for a more advantageous (or more disadvantageous) condition as described above. In other words, weighting of each reference direction may be performed under any condition. For example, a weight for (the reference direction and the set position of) an object associated with an input device 8 may be changed in accordance with an operation of the input device 8 performed by each player.

In the present embodiment, the imaging direction of the virtual camera is calculated, by performing predetermined correction of (correction of adding a predetermined downward vector to) the above average direction. However, in an alternative embodiment, the imaging direction of the virtual camera may be caused to agree with the above average direction.

In the present embodiment, the above average direction is calculated by performing weighted averaging of the reference direction of each boat. However, in an alternative embodiment, the above average direction may be calculated by simply averaging each reference direction. Similarly, in an alternative embodiment, the fixation point of the virtual camera may be calculated by simply averaging the set position Ai of each boat. Alternatively, the fixation point of the virtual camera may be calculated by averaging the position (the position Pi in the game space) of each boat.

In the present embodiment, the imaging direction and the fixation point of the virtual camera are set by the aforementioned methods. However, in an alternative embodiment, only the imaging direction of the virtual camera may be set by the aforementioned method, and the fixation point of the virtual camera may be set by another method (e.g. the fixation point is always set on the center line of the course). Alternatively, only the fixation point of the virtual camera may be set by the aforementioned method, and the imaging direction of the virtual camera may be set by another method (e.g. the imaging direction is set to the course forward direction at the fixation point).

In the present embodiment, the imaging direction of the virtual camera is calculated by performing weighted averaging of the reference directions of a plurality of objects displayed on the screen. In an alternative embodiment, the imaging direction of the virtual camera may be calculated by performing weighted averaging of the reference directions of some objects among a plurality of objects being displayed. For example, when there is a game character in the game space other than player characters, the reference direction of this game character may not influence the imaging direction of the virtual camera.

In the present embodiment, the canoe game is exemplified. However, the aforementioned method of setting the virtual camera may be applied to various games. The aforementioned method may be applied to various games in which a plurality of player objects are displayed on one screen, for example, games of track events (track and field events) such as short-distance sprints, swimming, and the like, and games of soccer and rugby. Further, in addition to games in which a plurality of player objects move on a plane, the aforementioned method of setting the virtual camera is applicable to games in which a plurality of objects (e.g. airplanes, and the like) are also moveable in the up-down direction in a three-dimensional game space.

The game program of the present invention may be supplied to the game apparatus 3 not only via an external storage medium such as the optical disc 4, but also via a wired or wireless communication path. Further, the above program may be executed by a hand-held game apparatus. Still further, the game program may be prestored in a non-volatile storage device provided within the game apparatus 3. It is noted that an information storage medium (a computer-readable storage medium) for storing the game program may be a CD-ROM, DVD or other similar optical disc storage medium, or may be a non-volatile semiconductor memory.

In the present embodiment, the processing of the aforementioned flow chart is executed by the CPU 10 of the game apparatus 3 executing the game program. In an alternative embodiment, a part or the entirety of the above processing may be executed by a dedicated circuit provided within the game apparatus 3.

While the invention has been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program that is executed by a computer of a game apparatus that displays, on a display device, an image of a virtual space that is taken by a virtual camera, a plurality of objects being present in the virtual space,
the game program causing the computer to:
    move the plurality of objects in the virtual space;
    calculate, as a reference direction of each object, a direction based on a moving direction and/or a facing direction of each object, and calculate an average direction by performing weighted averaging of the calculated reference directions of the plurality of objects under a first condition;
    setting an imaging direction of the virtual camera based on the average direction; and
    displaying, based on the imaging direction that is set, a taken image of the virtual space on the display device.

2. The storage medium according to claim 1, wherein the first condition is a condition in which, in a game executed by the game program, when the object is in an advantageous situation as compared with the other objects, a weight for the reference direction of the object is increased.

3. The storage medium according to claim 2, wherein the advantageous situation is a situation in which at least one of a movement distance, a number of wins, a winning percentage, and a score of the object is greater than that of the other objects.

4. The storage medium according to claim 1, wherein the first condition is a condition in which, in a game executed by the game program, when the object is in a disadvantageous situation as compared with the other objects, a weight for the reference direction of the object is increased.

5. The storage medium according to claim 4, wherein the disadvantageous situation is a situation in which at least one of a movement distance, a number of wins, a winning percentage, and a score of the object is less than that of the other objects.

6. The storage medium according to claim 1, wherein:
    the game program further causes the computer to:
        calculate an average position by performing, under a second condition, weighted averaging of positions based on positions of the plurality of objects; and
        setting a fixation point of the virtual camera based on the average position; and
    based on the fixation point that is set, displays a taken image of the virtual space on the display device.

7. The storage medium according to claim 6, wherein:
    the game program further causes the computer to calculate a set position of each object based on the position of each object; and
    calculate the average position by performing, under the second condition, weighted averaging of each set position that is calculated.

8. The storage medium according to claim 7, wherein based on the reference direction and the position of each object, a set position for each object is calculated.

9. The storage medium according to claim 6, wherein the second condition is a condition in which, in a game executed by the game program, when the object is in an advantageous situation as compared with the other objects, a weight for the set position of the object is increased.

10. The storage medium according to claim 9, wherein the advantageous situation is a situation in which at least one of a movement distance, a number of wins, a winning percentage, and a score of the object is greater than that of the other objects.

11. The storage medium according to claim 6, wherein the second condition is a condition in which, in a game executed by the game program, when the object is in a disadvantageous situation as compared with the other objects, a weight for the set position of the object is increased.

12. The storage medium according to claim 11, wherein the disadvantageous situation is a situation in which at least one of a movement distance, a number of wins, a winning percentage, and a score of the object is less than that of the other objects.

13. The storage medium according to claim 1, wherein:
    the game program further causes the computer to calculate a protruding degree to which at least one of the plurality of objects protrudes from an imaging range of the virtual camera; and
    enlarge or reduce the imaging range in accordance with the protruding degree that is calculated, and display a taken image of the virtual space on the display device.

14. The storage medium according to claim 13, wherein the imaging range is enlarged or reduced by moving, in accordance with the protruding degree that is calculated, the virtual camera in the imaging direction or in a direction opposite to the imaging direction.

15. The storage medium according to claim 1, wherein:
    the game program further causes the computer to:
        calculate forward directions that are directions in which the plurality of objects should move; and
        correct a moving direction of each object based on the forward directions of each object.

16. The storage medium according to claim 15, wherein:
    the game program further causes the computer to generate external forces in the forward directions calculated, with respect to the plurality of objects; and
    correct the moving direction of each object by applying, to each object, the external force generated.

17. The storage medium according to claim 1, wherein:
    at least one input device is connected to the game apparatus; and
    based on an input from the input device, moving at least one of the plurality of objects.

18. The storage medium according to claim 17, wherein the input device is connected to the game apparatus so as to be associated with each of the plurality of objects.

19. The storage medium according to claim 2, wherein:
    the game executed by the game program is a game to compete in quickly reaching a predetermined position in the virtual space; and a situation in which the object is closer to the predetermined position in the virtual space is determined to be an advantageous situation for rules of the game.

20. The storage medium according to claim 4, wherein:
the game executed by the game program is a game to compete in quickly reaching a predetermined position in the virtual space; and
a situation in which the object is closer to the predetermined position in the virtual space is determined to be an advantageous situation for rules of the game.

21. The storage medium according to claim 9, wherein:
the game executed by the game program is a game to compete in quickly reaching a predetermined position in the virtual space; and
a situation in which the object is closer to the predetermined position in the virtual space is determined to be an advantageous situation for rules of the game.

22. The storage medium according to claim 11, wherein:
the game executed by the game program is a game to compete in quickly reaching a predetermined position in the virtual space; and
a situation in which the object is closer to the predetermined position in the virtual space is determined to be an advantageous situation for rules of the game.

23. The storage medium according to claim 1, further operable to calculate an average direction by performing, under the first condition, weighted averaging of each reference direction calculated by combining a moving direction and a facing direction of each object at a predetermined rate.

24. The storage medium according to claim 1, wherein:
the game program further causes the computer to calculate forward directions that are directions in which the plurality of objects should move; and
set a weight for the reference direction of each object in accordance with an angle between the reference direction of each object and the forward direction of each object.

25. The storage medium according to claim 24, further including setting a weight for the reference direction of the object based on an angle between the forward direction and the reference direction of the object such that the smaller the angle is the greater the weight is.

26. The storage medium according to claim 1, wherein:
the game program further causes the computer to calculate forward directions that are directions in which the plurality of objects should move; and
calculate an average direction by performing, under the first condition, weighted averaging of the reference directions of the plurality of objects and a direction obtained by averaging the forward directions of the plurality of objects.

27. A non-transitory storage medium having stored thereon a game program that is executed by a computer of a game apparatus that displays, on a display device, an image of a virtual space that is taken by a virtual camera, a plurality of objects being present in the virtual space,
the game program causing the computer to:
move the plurality of objects in the virtual space;
set, as a reference direction of each object, a direction based on a moving direction and/or a facing direction of each object, and for calculating a set position based on the reference direction and a position of each object;
calculate an average position by performing, under a predetermined condition, weighted averaging of each set position calculated;
setting a fixation point of the virtual camera based on the average position; and
displaying, based on the fixation point, a taken image of the virtual space on the display device.

28. A game apparatus that displays, on a display device, an image of a virtual space that is taken by a virtual camera, a plurality of objects being present in the virtual space, the game apparatus comprising:
object moving unit for moving the plurality of objects in the virtual space;
average direction calculation unit for calculating, as a reference direction of each object, a direction based on a moving direction and/or a facing direction of each object, and for calculating an average direction by performing weighted averaging of the calculated reference directions of the plurality of objects under a first condition;
imaging direction setting unit for setting an imaging direction of the virtual camera based on the average direction; and
display control unit for displaying, based on the imaging direction that is set by the imaging direction setting unit, a taken image of the virtual space on the display device.

29. A game apparatus that displays, on a display device, an image of a virtual space that is taken by a virtual camera, a plurality of objects being present in the virtual space, the game apparatus comprising:
object moving unit for moving the plurality of objects in the virtual space;
set position calculation unit for setting, as a reference direction of each object, a direction based on a moving direction and/or a facing direction of each object, and for calculating a set position based on the reference direction and a position of each object;
average position calculation unit for calculating an average position by performing, under a predetermined condition, weighted averaging of each set position calculated by the set position calculation unit;
fixation point setting unit for setting a fixation point of the virtual camera based on the average position; and
display control unit for displaying, based on the fixation point that is set by the fixation point setting unit, a taken image of the virtual space on the display device.

30. A game system having a game program that is executed by a computer that displays, on a display device, an image of a virtual space that is taken by a virtual camera, a plurality of objects being present in the virtual space,
the game system including:
an object moving unit for moving the plurality of objects in the virtual space;
an average direction calculating unit for calculating, as a reference direction of each object, a direction based on a moving direction and/or a facing direction of each object, and for calculating an average direction by performing weighted averaging of the calculated reference directions of the plurality of objects under a first condition;
an imaging direction setting unit for setting an imaging direction of the virtual camera based on the average direction; and
a display control unit for displaying, based on the imaging direction that is set, a taken image of the virtual space on the display device.

31. A method of operating a game that is executed by a computer of a game apparatus that displays, on a display device, an image of a virtual space that is taken by a virtual camera, a plurality of objects being present in the virtual space, the method comprising:
  moving the plurality of objects in the virtual space;
  calculating, as a reference direction of each object, a direction based on a moving direction and/or a facing direction of each object, and calculating an average direction by performing weighted averaging of the calculated reference directions of the plurality of objects under a first condition;
  setting an imaging direction of the virtual camera based on the average direction; and
  displaying, based on the imaging direction that is set, a taken image of the virtual space on the display device.

32. A game system having a game program that is executed by a computer of a game apparatus that displays, on a display device, an image of a virtual space that is taken by a virtual camera, a plurality of objects being present in the virtual space, the game system comprising:
  an object moving unit for moving the plurality of objects in the virtual space;
  a set position calculation unit for setting, as a reference direction of each object, a direction based on a moving direction and/or a facing direction of each object, and for calculating a set position based on the reference direction and a position of each object;
  a average position calculation unit for calculating an average position by performing, under a predetermined condition, weighted averaging of each set position calculated by the set position calculation unit;
  a fixation point setting unit for setting a fixation point of the virtual camera based on the average position; and
  a display control unit for displaying, based on the fixation point that is set by the fixation point setting unit, a taken image of the virtual space on the display device.

33. A method for operating a game program that is executed by a computer of a game apparatus that displays, on a display device, an image of a virtual space that is taken by a virtual camera, a plurality of objects being present in the virtual space, the method comprising:
  moving the plurality of objects in the virtual space;
  setting, as a reference direction of each object, a direction based on a moving direction and/or a facing direction of each object, and calculating a set position based on the reference direction and a position of each object;
  calculating an average position by performing, under a predetermined condition, weighted averaging of each set position calculated;
  setting a fixation point of the virtual camera based on the average position; and
  displaying, based on the fixation point, a taken image of the virtual space on the display device.

* * * * *